(12) United States Patent
Shibata

(10) Patent No.: US 8,540,332 B2
(45) Date of Patent: Sep. 24, 2013

(54) IMAGE PROCESSING APPARATUS, IMAGE PROCESSING METHOD, AND IMAGE FORMING APPARATUS

(75) Inventor: Hiroyuki Shibata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 39 days.

(21) Appl. No.: 13/401,533

(22) Filed: Feb. 21, 2012

(65) Prior Publication Data

US 2012/0229549 A1   Sep. 13, 2012

(30) Foreign Application Priority Data

Mar. 7, 2011  (JP) ................................ 2011-049252

(51) Int. Cl.
*B41J 2/205* (2006.01)
*G06K 15/02* (2006.01)

(52) U.S. Cl.
USPC ............................................. 347/15; 358/1.2

(58) Field of Classification Search
USPC .............. 347/15, 12, 14; 358/1.2, 3.26, 3.13
See application file for complete search history.

(56) References Cited

U.S. PATENT DOCUMENTS

| | | | | |
|---|---|---|---|---|
| 7,961,355 B2 * | 6/2011 | Kakutani | ..................... | 358/3.13 |
| 8,368,961 B2 * | 2/2013 | Yamada | ...................... | 358/3.13 |
| 2006/0061616 A1 | 3/2006 | Yamazaki | | |
| 2006/0209109 A1 * | 9/2006 | Arazaki | .......................... | 347/12 |
| 2007/0046706 A1 * | 3/2007 | Kayahara et al. | ............... | 347/14 |

FOREIGN PATENT DOCUMENTS

| | | |
|---|---|---|
| JP | 2002-052758 A | 2/2002 |
| JP | 2006-82496 A | 3/2006 |
| JP | 2009-006510 A | 1/2009 |
| JP | 2010-274656 A | 12/2010 |

* cited by examiner

*Primary Examiner* — Stephen Meier
*Assistant Examiner* — Carlos A Martinez
(74) *Attorney, Agent, or Firm* — Birch, Stewart, Kolasch & Birch, LLP

(57) ABSTRACT

An image processing apparatus includes a multiple value conversion device which carries out quantization processing of original image data having multiple tones (M values) to convert the original image data to image data of N values having fewer tones than the original image data (where M and N are integers satisfying M>N≧2), wherein: the recording head has a two-dimensional nozzle arrangement where the nozzle rows are arranged in a first direction which is a direction of the relative movement between the recording head and the recording medium, and the multiple value conversion device generates the image data of N values representing a dot pattern having blue noise characteristics in the first direction and green noise characteristics in a second direction which is a direction perpendicular to the first direction on the recording medium to achieve tonal representation based on the dot pattern having these frequency characteristics.

19 Claims, 23 Drawing Sheets

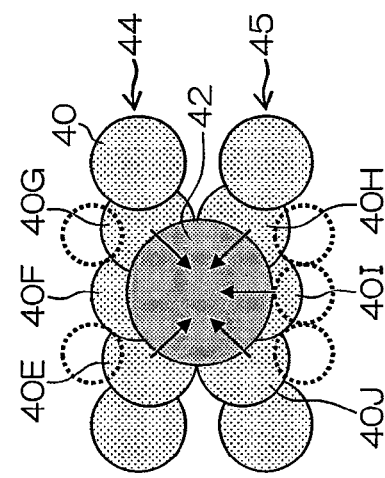
FIG.4A RELATED ART
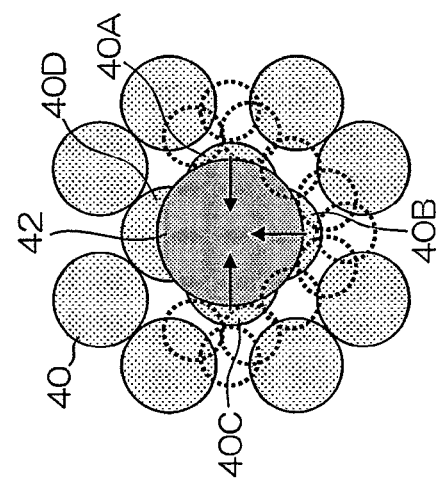
FIG.4B EMBODIMENT

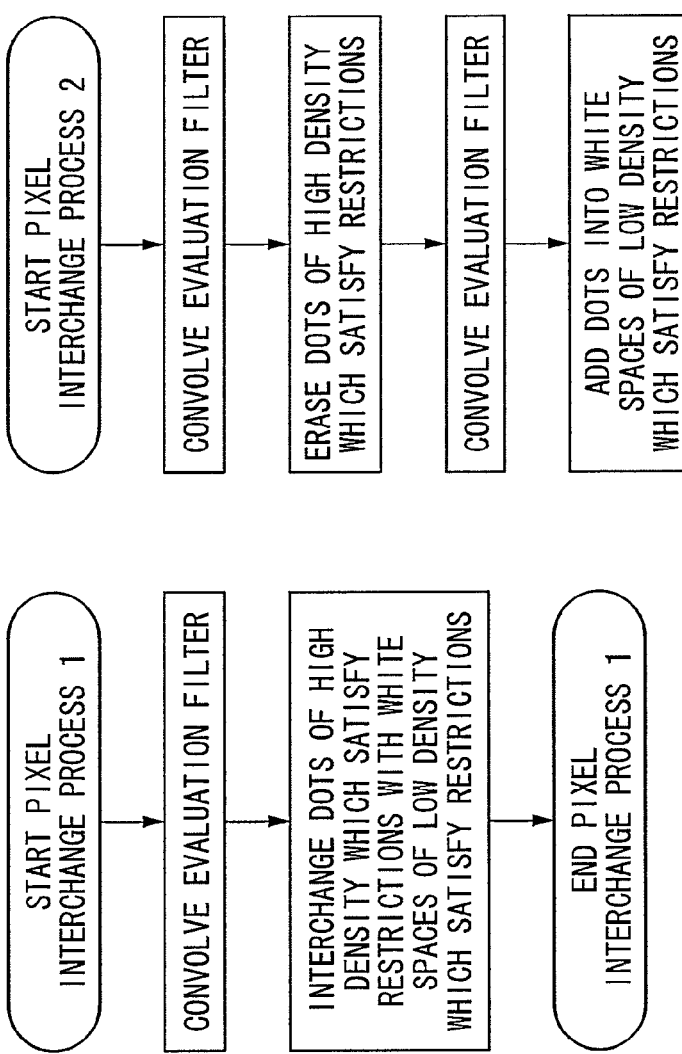
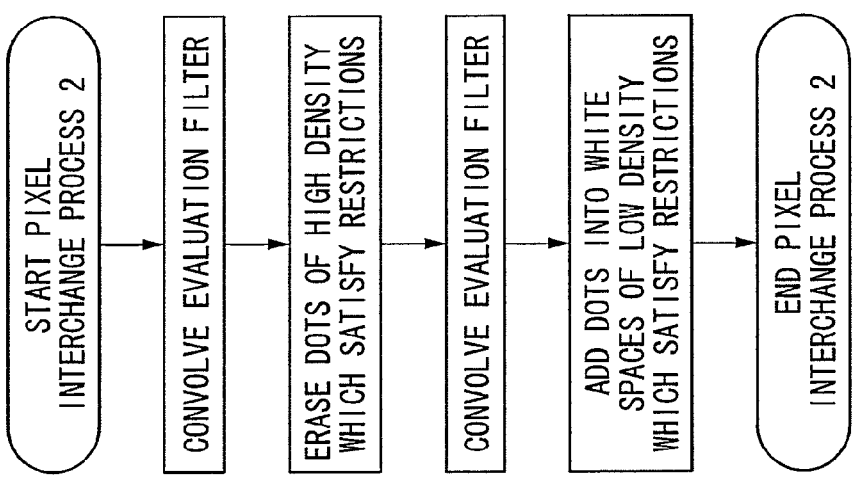
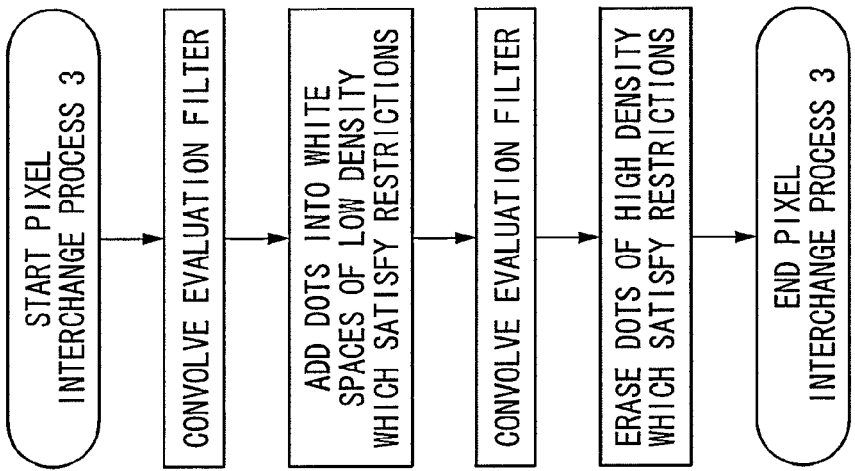
FIG.10A
FIG.10B
FIG.10C

FIG.13

| | | | | | | |
|---|---|---|---|---|---|---|
| 0 | 0 | 0 | 0 | 0 | 0 | 0 |
| 0 | 0 | 0 | 1 | 0 | 0 | 0 |
| 0 | 1 | 4 | 5 | 4 | 1 | 0 |
| 1 | 2 | 3 | 10 | 3 | 2 | 1 |
| 0 | 1 | 4 | 5 | 4 | 1 | 0 |
| 0 | 0 | 0 | 1 | 0 | 0 | 0 |
| 0 | 0 | 0 | 0 | 0 | 0 | 0 |

CONVEYANCE DIRECTION ↑

FIG. 17

IMAGE PROCESSING APPARATUS, IMAGE PROCESSING METHOD, AND IMAGE FORMING APPARATUS

BACKGROUND OF THE INVENTION

1. Field of the Invention

The present invention relates to an image processing apparatus and method, and to an image forming apparatus, and more particularly, to digital half-toning technology suitable for an image forming apparatus, such as an inkjet recording apparatus, which represents tonal gradations by the arrangement of dots.

2. Description of the Related Art

An inkjet recording apparatus forms a desired image on a print medium by ejecting ink droplets from nozzles while moving a recording head in which a plurality of ink ejection ports (nozzles) are arranged, and a print medium, relatively with respect to each other. In order to achieve a high-definition image output, the recording head used is a head with a two-dimensional nozzle arrangement in which the recording resolution is raised by means of a nozzle layout in which a plurality of nozzles are arranged two-dimensionally (the head may be also called a "two-dimensional head").

Furthermore, in order to achieve good printing productivity, a composition for a single-pass image formation method is known, in which an image of a prescribed resolution is formed on a print medium by using a long line head (called a page-wide head or a full line-type head) having a nozzle arrangement which covers the whole range of the image formation region in the width direction of the print medium (hereinafter called the "x direction") which is perpendicular to the conveyance direction of the medium (hereinafter called the "y direction"), and by adopting a composition in which this long head is arranged substantially perpendicularly with respect to the conveyance direction (y direction) of the print medium and the print medium is moved relatively just once with respect to the head.

In an inkjet recording apparatus based on a single-pass image formation method using a two-dimensional head of this kind, when high-speed printing is carried out, the landing time difference between the adjacent dots is short, and therefore the deposited droplets which have not been absorbed into the print medium combine together on the print medium, causing the granularity of the image to become worse. This issue of granularity is particularly marked in shadow areas.

Furthermore, normally, in inkjet printing, image formation is carried out by a multiple scanning method (multi-pass printing method) which completes an image of a prescribed resolution by means of a plurality of image formation scanning actions performed with respect to the image formation region on the print medium.

Forming the head to a long dimension is an effective means for achieving high productivity, and also it is desired to reduce the number of heads to a minimum from a cost viewpoint. For example, it is necessary to avoid compositions which are provided with a plurality of nozzles capable of recording dots onto the same pixel position on the print medium (nozzle redundancy), and to reduce the extent of overlapping of the heads. However, reducing redundant nozzles and the extent of head multiplexing leads to possibilities that the ejection characteristics of the individual nozzles are liable to be reflected in the image formation results, and band-shaped non-uniformities arise due to fluctuation between the nozzles.

In other words, in order to achieve high productivity at low cost, it is important to achieve both good granularity and reduced band-shaped non-uniformities, from the viewpoint of image quality. In general, it is beneficial to raise the dot size so as to cover up the gaps between dots, in order to improve banding. However, there is a possibility that increasing the dot size leads to worse granularity, and the problem described above (achieving both good granularity and reduced banding) cannot be resolved. Moreover, increasing the dot size involves a problem of increased ink volume. Increasing the ink volume means a requirement for increasing the drying properties, especially in the case of high-speed printing, which leads to higher costs in terms of increased capabilities of the drying apparatus, and the like.

In Japanese patent application publication No. 2006-82496, in order to resolve the problem of banding, technology is disclosed which suppresses band-shaped non-uniformities by modifying the image formation pattern, rather than controlling the dot size. In other words, a half-toning technique which changes the ratio of a band-shaped pattern and a distributed pattern is proposed.

As described in Japanese patent application publication No. 2006-82496, when a band-shaped pattern is used, the dots are liable to join together on the print medium, and therefore improvements can be definitely made in terms of banding. However, if patterns of two types, namely, a band-shaped pattern and a distributed pattern are simply combined, then there is a possibility that granularity becomes worse.

Furthermore, Japanese patent application publication No. 2006-82496 does not take account of the worsening of granularity as a result of combination of adjacently deposited droplets which can occur in the case of high-speed printing.

SUMMARY OF THE INVENTION

The present invention has been contrived in view of these circumstances, an object thereof being to provide an image processing apparatus and method and an image forming apparatus which are capable of carrying out half-tone processing whereby both reduction of band-shaped non-uniformities and good granularity can be achieved.

One aspect of the invention is directed to an image processing apparatus for generating binary or multiple-value image data for forming an image on a recording medium by ejecting droplets from nozzles of nozzle rows of a recording head while relative movement between the recording medium and the recording head is caused, the nozzles serving as ejection ports for ejecting the droplets, the image processing apparatus comprising a multiple is value conversion device which carries out quantization processing of original image data having multiple tones (M values) so as to convert the original image data to image data of N values having fewer tones than the original image data (where M and N are integers satisfying M>N≧2), wherein: the recording head has a two-dimensional nozzle arrangement in which the nozzle rows are arranged in a first direction which is a direction of the relative movement between the recording head and the recording medium, and the multiple value conversion device generates the image data of N values representing a dot pattern having blue noise characteristics in the first direction and green noise characteristics in a second direction which is a direction perpendicular to the first direction on the recording medium so as to achieve tonal representation based on the dot pattern having these frequency characteristics.

Another aspect of the invention is directed to an image processing method of generating binary or multiple-value image data for forming an image on a recording medium by ejecting droplets from nozzles of nozzle rows of a recording head while relative movement between the recording medium and the recording head is caused, the nozzles serving as ejection ports for ejecting the droplets, the image processing method comprising a multiple value conversion step of carrying out quantization processing of original image data having multiple tones (M values) so as to convert the original image data to image data of N values having fewer tones than the original image data (where M and N are integers satisfying M>N≧2), wherein: the recording head has a two-dimensional nozzle arrangement in which the nozzle rows are arranged in a first direction which is a direction of the relative movement between the recording head and the recording medium, and in the multiple value conversion step, the image data of N values representing a dot pattern having blue noise characteristics in the first direction and green noise characteristics in a second direction which is a direction perpendicular to the first direction on the recording medium is generated so as to achieve tonal representation based on the dot pattern having these frequency characteristics.

Another aspect of the invention is directed to an image forming apparatus comprising: a recording head having a nozzle row in which a plurality of nozzles serving as ejection ports for ejecting droplets are arranged; a relative movement device which causes relative movement of the recording head and a recording medium; an image processing apparatus defined above; and a recording control device which controls a droplet ejection operation from the plurality of nozzles of the recording head according to the image data of N is values generated by the image processing apparatus.

Further modes of the present invention will become apparent from the description of the present specification and the drawings.

According to the present invention, it is possible to suppress deterioration of granularity caused by landing interference, as well as being able to restrict the visibility of banding non-uniformities caused by landing position displacement.

BRIEF DESCRIPTION OF THE DRAWINGS

FIGS. 4A and 4B are schematic diagrams showing deterioration of granularity as a result of landing interference, and a method of improving same;

FIGS. 10A to 10C are flowcharts of a pixel interchange process;

FIG. 13 is a diagram showing one example of a real space filter;

FIG. 17 is a diagram showing a portion of a dither matrix relating to an embodiment;

DESCRIPTION OF THE PREFERRED EMBODIMENTS

Composition of Inkjet Printing Apparatus

Figure 1:
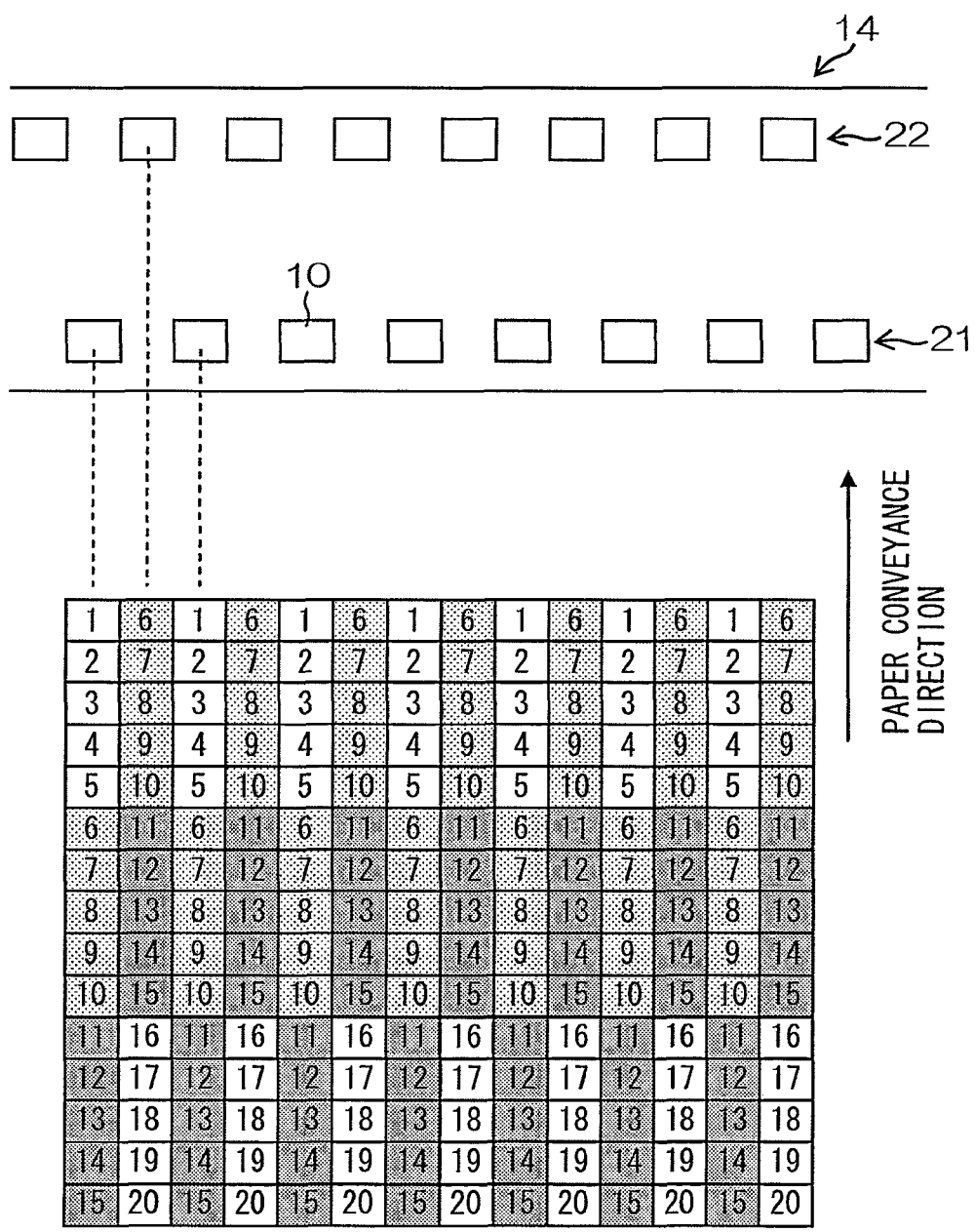
FIG. 1 shows an illustrative diagram of a droplet ejection sequence in a case where dots are recorded at respective pixels on a print medium by relative movement of a two-dimensional head and the print medium.

FIG. 1 shows an illustrative diagram of the deposition sequence (droplet ejection sequence) in a case where dots are recorded on a print medium by relative movement of a two-dimensional head and the print medium. Here, the recording medium (paper) is conveyed from the upper side toward the lower side in FIG. 1. The direction of conveyance of the paper is called the "y direction" and the paper width direction perpendicular to the direction of conveyance (the perpendicular to conveyance direction) is called the "x direction". The y direction corresponds to a "first direction" and the x direction corresponds to a "second direction".

Reference numeral 10 in the drawings represents an ink ejection port (nozzle). Here, in order to simplify the description, a staggered matrix arrangement is given as one example of a nozzle arrangement. The print head 14 shown in FIG. 1 has a two-dimensional nozzle arrangement in which a plurality of nozzle rows (ejection port rows) 21, 22 comprising nozzles 10 arranged at uniform intervals in the x direction (here, two rows) are aligned at different positions in the y direction. The nozzle pitch is uniform in each of the nozzle rows 21, 22 in which nozzles 10 are aligned in a straight line following the x direction (a pitch equivalent to two pixels is depicted: two pixel period is illustrated), and the interval in the conveyance direction between nozzle rows which are adjacent in the y direction is also uniform (an interval equivalent to six pixels is depicted: six pixel interval is illustrated).

The nozzle rows which are adjacent in the y direction are arranged in a positional relationship shifted by one pixel in the x direction. The pixel pitch is defined by the recording resolution (for example, one pixel corresponds to approximately 21.2 μm in the case of 1200 dpi resolution). In the two-row nozzle arrangement which is depicted, if numbers are assigned to the nozzle rows in such a manner that the upstream side in terms of the paper conveyance direction (the lower side in the drawing) is defined as a first row and the downstream side is defined as a second row, then the dots in a line of continuous pixels which are arranged in the x direction on the print medium (the x-direction scanning line) are recorded with a time differential in such a manner that pixels are recorded by the second nozzle row between alternate pixels that have been recorded by the first nozzle row.

The cells assigned with the numbers 1 to 20 in FIG. 1 represent pixels on the print medium, and the numbers in the cells represent the sequence of droplet ejection (the dot deposition sequence). As shown in FIG. 1, in the case of printing by a two-dimensional head, dots which are adjacent in the x direction on the print medium are normally ejected at different timings, from nozzles which are separated by a pitch of several pixels in the y direction in the nozzle arrangement of the two-dimensional head.

In the case of FIG. 1, looking in particular at the first row of the pixel rows following the x direction in the print medium (the uppermost row), the deposition sequence is "1, 6, 1, 6, 1, 6, . . . " from the left-hand side, and the deposition time difference between the adjacent pixels in the x direction, namely, the pixel ("1") recorded by the first nozzle row of the nozzle arrangement and the pixel ("6") recorded by the second nozzle row, is "5". Furthermore, looking in particular at the left-hand most column of the pixel columns following the y direction on the print medium, the deposition sequence is "1, 2, 3, 4, 5, . . . " from the top, and the deposition time difference between the adjacent pixels in the y direction is "1".

In this way, in a composition which carries out image formation by relative movement of a two-dimensional head 14 and a print medium, one pixel has different landing to time differences with respect to pixels which are adjacent thereto in the conveyance direction (y direction) and pixels which are adjacent thereto in the perpendicular to conveyance direction (x direction). In other words, the deposition time difference between adjacent pixels in the conveyance direction is shorter and the deposition time difference between adjacent pixels in the perpendicular direction to the conveyance direction is longer.

A composition of this kind has the following meaning in terms of the combination of dots relating to granularity and the ejection position accuracy in relation to banding non-uniformities.

Combination of Dots

The phenomenon of combination of deposited droplets occurs due to the following reasons.
[1] Before a previously deposited ink droplet is absorbed into a print medium (paper), a subsequent (following) ink droplet is deposited and these two ink droplets combine (join together) on the print medium.
[2] In a system which fixes pigment onto paper by aggregation-reaction between clear ink (ink forming a pre-treatment liquid) and ink containing coloring material (pigment), a phenomenon of combination of dots occurs when the aggregation reaction time is longer than the deposition time difference between the two dots.

In the case of either [1] or [2] above, a longer deposition time difference between adjacent dots is beneficial from the viewpoint of combination between dots, and is also beneficial from the viewpoint of granularity.

In the case of the configuration in FIG. 1 where the landing time difference between adjacent pixels in the x direction is long, supposing that the dots are continuous in the y direction, then the landing time difference is short in the y direction, which gives rise to combination of the dots and is disadvantageous in terms of granularity. Therefore, from the viewpoint of granularity, rather than the dots being continuous in the longitudinal (y) direction, it is desirable for the dots to be continuous in the lateral direction (x direction) or an oblique direction.

Ejection Position Accuracy

Banding non-uniformities occur due to the dots being arranged irregularly as a result of worsening of the ejection position accuracy (depositing position accuracy). The main cause of worsening of the ejection position accuracy is fluctuation in the ejection direction. Most often, fluctuation in the ejection direction is more marked in terms of fluctuation between nozzles than fluctuation in each nozzle. In the case of the present composition in which a plurality of nozzles are arranged in the conveyance perpendicular direction (x direction), banding oriented in the conveyance direction occur in the perpendicular direction, as a result of fluctuation between nozzles. On the other hand, band-shaped non-uniformities are not liable to occur in the direction perpendicular to this, due to the following reasons.
[Reason 1] Fluctuation in individual nozzles is relatively small, and depositing position error is not liable to occur in that direction.
[Reason 2] Supposing that depositing position error were to occur in this direction, since there is fluctuation between nozzles, this error is not liable to produce band shapes.

Furthermore, there is generally the following relationship between the image formation pattern (dot pattern) and banding and granularity.

In respect of granularity, desirably, the dots are arranged at a high-frequency distribution (namely, the white spaces and dots have a short spatial cycle). If the dots are arranged at low frequency (a long cycle of the dots and white spaces), then the granularity is liable to become worse.

In respect of banding non-uniformities, desirably, dots are arranged so as to have an overlap with adjacent dots. This means that the dots are distributed at low frequency. If the dots are arranged at high frequency, then the overlaps between dots tend to be lost, and banding is liable to become worse.

Taking account of the apparatus composition, and the relationship between the pattern, banding non-uniformities and granularity described above, it is possible to achieve a synergetic effect which is beneficial in terms of both banding non-uniformities and granularity, by adopting a composition which imparts the following dot pattern characteristics.

Basic Dot Pattern Characteristics (Especially Intermediate Tones)

In the present embodiment, in order to avoid a dot combination phenomenon, dots are arranged at high frequency in the conveyance direction (in other words, arrangement of continuous dots in the y direction is avoided as far as possible). In the conveyance direction, fluctuation in each nozzle is small and the ejection position accuracy is high, which means that banding non-uniformities do not occur even if the dots are arranged at very high frequency. Moreover, in addition to suppressing the combination phenomenon, the pattern also has a high frequency and granularity is good.

In the perpendicular direction (x direction), as far as possible, dots are arranged so as to be continuous (at low frequency). The deposition time difference in the x direction is long compared to the y direction and combination of dots is not liable to occur, so granularity does not become worse. Furthermore, by arranging the dots in this fashion, it is possible to suppress deterioration of banding, by the characteristics of the pattern (a configuration in which adjacent dots are arranged in overlapping fashion).

Figure 2:
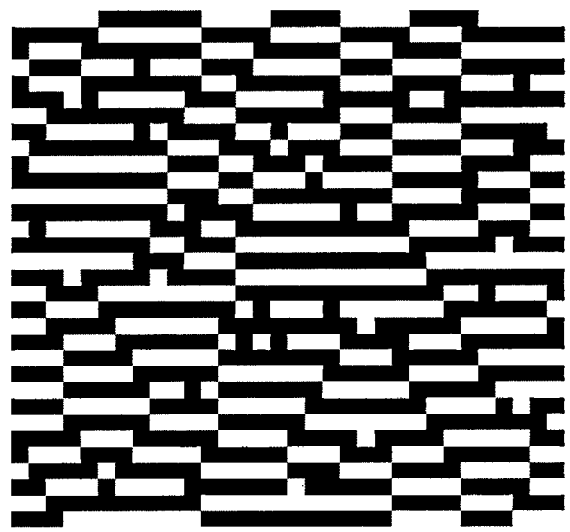
FIG. 2 is a diagram showing an example of a dot pattern according to an embodiment.
Figure 3:
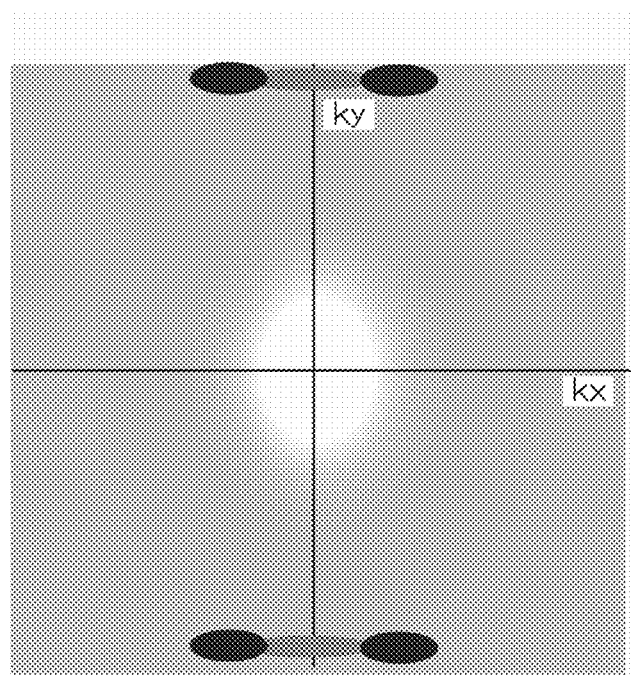
FIG. 3 is a diagram showing frequency characteristics in FIG. 2.

FIG. 2 shows one example of a dot pattern having characteristics of this kind. FIG. 3 shows frequency characteristics of a dot pattern. FIG. 3 shows a dot pattern after two-dimensional Fourier transform, where the power (square of an absolute value) is represented by dark and light shading. The darker the shading, the higher the component amount.

As shown in FIG. 3, in the intermediate tones, the pattern which is achieved by the present embodiment has a high frequency (with a peak at the Nyquist frequency) in the conveyance direction (y direction) and a low frequency in the perpendicular direction (x direction). In other words, the pattern has blue noise characteristics in the conveyance direction and green noise characteristics in the perpendicular direction.

A pattern in which the dots are sufficiently distributed in a highlight region and a shadow region is generated on the basis of the intermediate tones having these frequency characteristics.

Countermeasures in Relation to Granularity in Shadow Regions

The problem of worsening granularity caused by a dot combination phenomenon has been described already, but this phenomenon is especially marked in shadow regions where the dots are arranged densely. This phenomenon is illustrated in FIGS. 4A and 4B.

FIG. 4A is a schematic drawing of a dot pattern based on a related-art half-toning process, and FIG. 4B is a schematic drawing of a pattern according to an embodiment of the present invention.

In the related art, in order to avoid the combination of dots, it is common to arrange the dots in as a distributed fashion as possible. For instance, a typical example of an arrangement of this kind is a dot pattern (halftone pattern) in which isolated dots are distributed two-dimensionally in a staggered configuration. If a dot is arranged additionally in the central white pixel (see FIG. 4A) of this staggered configuration, then the dots of the four pixels surrounding this pixel are drawn towards the central dot, and the blank white portion about the central dot (the portion indicated by the broken lines in the drawing) increases.

FIG. 4A shows an example in which a dot of a medium droplet dot (medium dot) 42 is arranged at a central white pixel of a staggered arrangement of small droplet dots 40. As shown in FIG. 4A, when the medium droplet dot 42 is arranged at the blank white pixel among the small droplet dots 40 which are arranged in distributed fashion, then this medium droplet dot 42 pulls the small droplet dots 40A, 40B, 40C, 40D of the four surrounding pixels adjacent to this dot 42, and draws these dots towards the center. As a result of this, the liquid droplets combine (merge) to form a collection of liquid (clump), thus increasing the white portion about the periphery of the dot 42 and making the granularity worse.

On the other hand, according to the dot arrangement in FIG. 4B based on an embodiment of the present invention, a medium droplet dot 42 is added in a central blank white pixel of a distribution of dots in which dot rows 44, 45 of small droplet dots 40 which are continuous in the lateral (x) direction are arranged in a distant fashion (at high frequency) in the longitudinal (y) direction.

In this case, the dots 40E to 40J which are adjacent to the medium droplet dot 42 are drawn to the central dot 42, but the increase in the white portion due to this movement is small compared to FIG. 4A, and therefore deterioration in the granularity is suppressed.

A pattern such as that shown in FIG. 4B can be achieved by arranging dots at high frequency in the conveyance direction and adding dots to the blank portions of this dot arrangement at low frequency in the perpendicular direction as described using FIGS. 2 to 3.

In the half-tone process according to the present embodiment, it is required to achieve a pattern such as that shown in FIGS. 2 to 3 and FIG. 4B for each tone in respective tonal regions, as well as linking these patterns together smoothly. Therefore, a configuration using multiple value processing as described below is employed.

Pattern formed by multiple-value processing (1) Mask Pattern

Figure 5C:
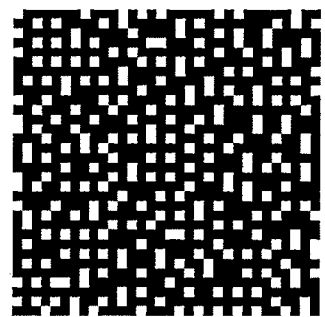
FIGS. 5A to 5C are diagrams showing examples of a mask pattern used in an embodiment.
Figure 5B:
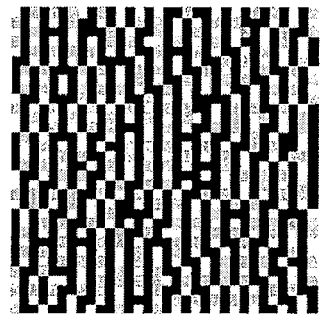
Figure 5A:
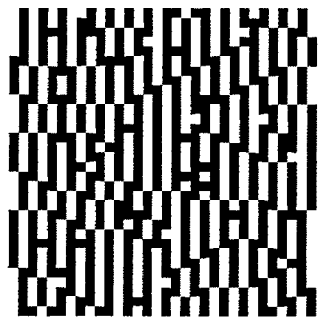

FIG. 5A shows a mask pattern which is used in the present embodiment. This is similar to the pattern illustrated in FIG. 2. As shown in FIG. 5A, the region of the mask pattern is divided up at high frequency (approximately every other pixel) in the conveyance direction, whereas in the perpendicular direction, weighting is applied to the low frequency side, compared to the conveyance direction, and the low frequency component is suppressed (see the frequency characteristics in FIG. 3).

FIG. 5B illustrates an example in which dots are arranged in distributed fashion in the white portions (blank white portions) of the mask pattern in FIG. 5A. The pixels which are depicted in gray in FIG. 5B indicate positions of the added dots.

FIG. 5C is an example of a pattern of a shadow region obtained as a result of the distributed arrangement of dots in FIG. 5B.

(2) Tonal Representations

In this way, in the intermediate tones and at least a portion of shadow tones, tones are represented by changing the number of dots while distributing the dots in divided regions on the basis of the mask pattern (FIG. 5A). For example, in the shadows, tones are represented by covering one set of regions divided by the mask pattern (the black regions of the mask pattern) with dots, and altering the number of dots in the remaining regions (the white regions). In this case, the dots are arranged in distributed fashion.

The black portions of the mask pattern shown in FIG. 5A correspond to "first regions" and the remaining white portions correspond to "second regions".

(3) Example of Dot Arrangement Based on Multiple Dots

When using a recording head which is capable of selectively recording dots of a plurality of types having different dot sizes (ejected droplet volumes), it is desirable to adopt a mode such as that indicated below, when forming the dot pattern. Here, in order to simplify the description, a case where dots of two types, large and small dots, are ejected selectively will be described.

Example 1

The lateral continuous portions of the mask pattern shown in FIG. 5A are set to small droplet dots, while large droplet dots are arranged in distributed fashion in the remaining portions (white portions) (large droplet dots are arranged in the portions indicated by the gray color in FIG. 5B). The dot diameter D1 of the small droplets is approximately twice, or desirably less than two times (i.e. less than twice), the period Ly of the printing resolution in the conveyance direction. This is in order to suppress worsening of the granularity as a result of landing interference in the conveyance direction (see the left-hand side in FIG. 6).

Example 2

Figure 6:
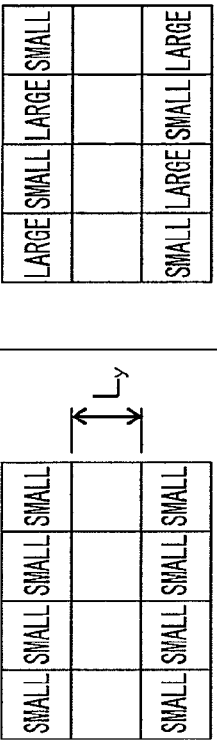
FIG. 6 is an illustrative diagram showing an example of a dot arrangement based on multiple dots.

Small droplet dots and large droplet dots are arranged alternately in the lateral continuous portions of the mask pattern shown in FIG. 5A (see the right-hand side in FIG. 6). In this case, the average value of the dot diameter D1 of the small droplets and the dot diameter D2 of the large droplets is desirably equal to or greater than twice the period Ly in the conveyance direction.

As well as arranging small droplet dots and large droplet dots alternately in the lateral direction, small droplet dots and large droplet dots are arranged alternately in the longitudinal direction also (in such a manner that dots of the same size are not aligned continuously).

Desirably, the average size of the plurality of dots arranged in a distributed fashion in this way is approximately twice, or not less than twice, the period Ly of the printing resolution in the conveyance direction.

According to a composition of this kind, the intervals (white margins) between the patterns of lateral continuous portions are covered over neatly and the granularity is improved, as shown on the right-hand side in FIG. 6. Furthermore, since large dots and small dots are distributed in mutually overlapping fashion in the lateral (x) direction, then the composition is resistant to banding.

(4) Effects of Dot Arrangement Achieved by the Present Embodiment

According to the dot arrangement described above, the average landing time difference between adjacent dots is relatively long, and therefore it is possible to suppress deterioration of granularity due to a dot combination phenomenon. Furthermore, according to this composition, in an image forming apparatus which has high depositing position accuracy (ejection accuracy) in the conveyance direction and has low depositing position accuracy (ejection accuracy) in the perpendicular direction, it is possible to obtain good images. More specifically, although dots are arranged in a high-frequency distribution in the conveyance direction, since the depositing position accuracy is high, then non-uniformities do not occur and the granularity can be improved. Furthermore, even if the deposition position accuracy is poor to some extent in the perpendicular direction, since the dots are continuous in this direction, then it is possible to restrict the visibility of banding caused by deposition position error.

Concrete Examples of Method of Implementing Half-Toning Process

First Method: Method Based on Dither Matrix

A method of generating a dither matrix for generating the dot arrangement described above is explained below.

Figure 7:
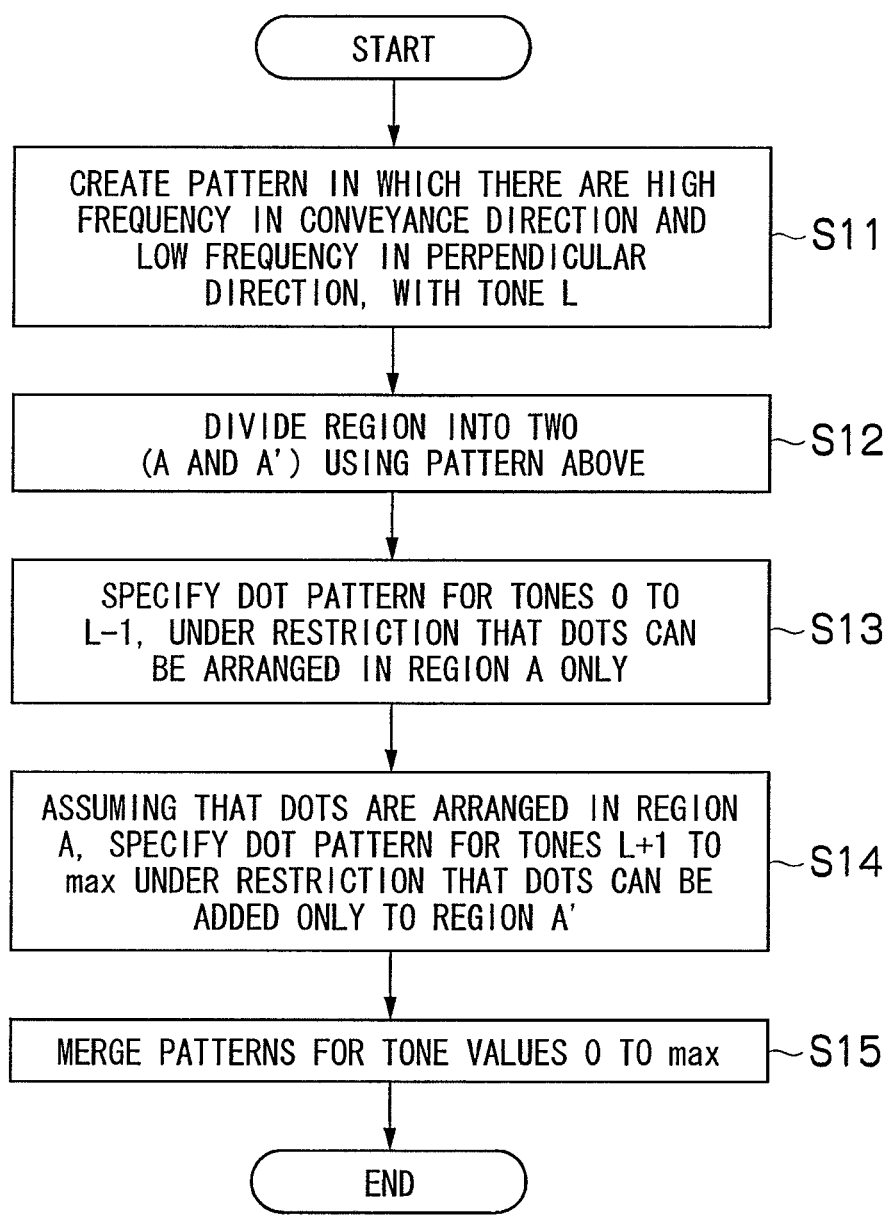
FIG. 7 is a flowchart showing a procedure for generating a dither matrix.

FIG. 7 is a flowchart showing one example of steps for generating a dither matrix. Initially, a binary filter for a pattern having relatively high frequency characteristics in the conveyance direction and relatively low frequency characteristics in the perpendicular direction is created with the intermediate tone (gradated tone L) (step S11). This binary filter has the frequency characteristics shown in FIG. 2, FIG. 3 and FIG. 5A.

The image region is divided into two using this binary filter (pattern) (step S12 in FIG. 7). The respective divided regions are called region A (which corresponds to a "first region") and region A' (which corresponds to a "second region").

In the tone range less than the intermediate tone value (gradated tone L) (the range of gradated tones 0 to L−1), the dot arrangement of each tone (in other words, the numerical values of the respective cells corresponding to the region A of the dither matrix) is specified under a restriction that dots are arranged only in the region A (step S13).

On the other hand, in the tonal range above the intermediate tone value (gradated tone L) (gradated tones L+1 to max), it is supposed that there are dots in the region A, and the dot arrangement for each tone is specified under a restriction that dots are added only in the region A' (step S14). In steps S13 and S14, desirably, a dither matrix is generated under conditions whereby the dots are distributed at as high a frequency as possible, while fulfilling the respective restrictions.

By integrating (merging) the patterns of the respective tones obtained at steps S13 and S14 (step S15), a dither matrix for determining a dot arrangement corresponding to each tone in the whole tonal range is obtained.

The dither matrix obtained in this way has high frequency in the conveyance direction and a relatively low frequency in the perpendicular direction, in the vicinity of the intermediate tones, and the dots are distributed in highlight regions and shadow regions. Furthermore, the patterns described in <Example 1> and <Example 2> above can be achieved by allocating the dots through extracting patterns by applying a suitable threshold value for each tone to the dither matrix.

Figure 8:
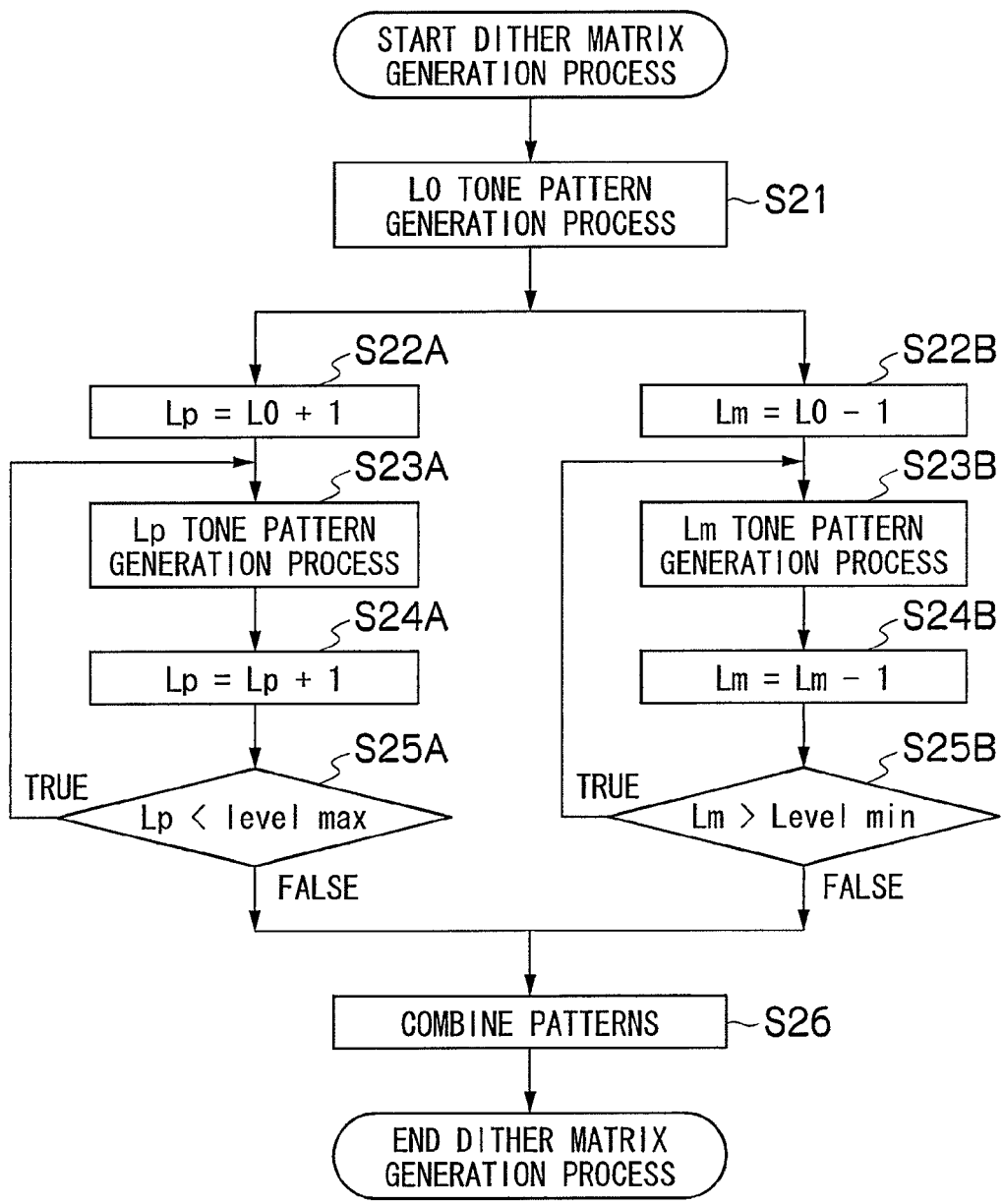
FIG. 8 is a flowchart showing a further procedure for generating a dither matrix.

The order of the processing in steps S13 and S14 can be changed appropriately, and these steps can also be carried out in parallel. FIG. 8 shows a flowchart of parallel processing.

Other Dither Matrix Generating Flow

FIG. 8 is a flowchart of a dither matrix generating process according to a further example.

Firstly, a pattern for the initial tone=L0 is generated (step S21). This process is the same as that in step S11 in FIG. 7.

Thereupon, processing for generating a pattern for each tone Lp in the tonal range to above the initial tone L0 (L0<Lp<level max) (the processing in steps S22A to S25A in FIG. 8), and processing for generating a pattern for each tone Lm in the tone range below the initial tone L0 (level min<Lm<L0) (the processing in steps S22B to S25B) is carried out in parallel. By combining the patterns of the respective tones obtained in this way (step S26), a target dither matrix can be obtained.

Method of Generating Patterns for Each Tone

According to the processing for generating the each tone pattern indicated by steps S11 and S13 to S14 in FIG. 7, and steps S21, S23A and S23B in FIG. 8, patterns are generated by taking an initial pattern generated by random numbers (in an initial pattern generation process) under restrictions limiting the positions for arranging the dots, and optimizing the pattern in relation to a pattern evaluation value, by a process of sequentially interchanging dots in accordance with the restrictions and the pattern evaluation value.

Figure 9:
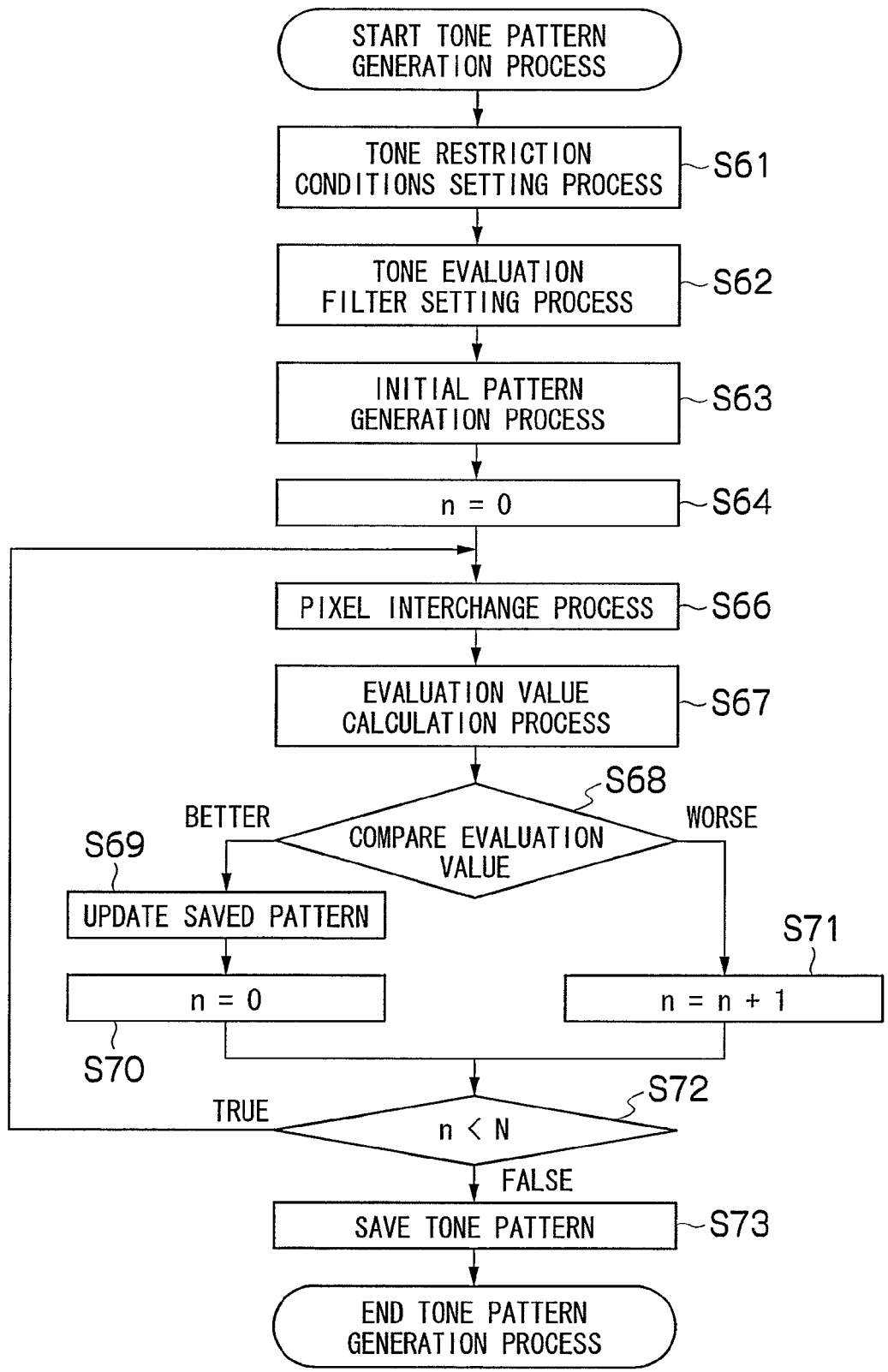
FIG. 9 is a flowchart of a tone pattern generation process.

FIG. 9 is a flowchart of processing for generating a pattern for each tone. The constituent elements of the flowchart in FIG. 9 are described below.

The tone restriction setting process in step S61 is a process for specifying a region where interchanging of dots is permitted, in the subsequent pixel interchange process (step S66) (in other words, the region where the arrangement of dots can be changed by optimization using an evaluation value as an index.) For example, the two restrictions shown in the examples given below are set.

(Restriction 1): A high-tone pattern includes a low-tone pattern, which is a general requirement of a dither matrix.
(Restriction 2): The positions for arranging dots are restricted in order to impart particular characteristics to the pattern, with the object of improving image quality, and the like. More details are described in the section of "Restrictions" below.

The evaluation filter setting process in step S62 involves processing for specifying an evaluation filter to be used in a pixel interchange process (step S66) and an evaluation value calculation process (step S67), and the like. The evaluation filter is a frequency filter which indicates weighting for each frequency component and which is used to multiply by the dot pattern in the frequency space (convolution in the real space). The characteristics of this evaluation filter are reflected in the pattern characteristics.

This evaluation filter is used in the following processes.
(1) The evaluation filter is used in the pixel interchange process (step S66) in order to specify the positions of dots to be interchanged.
(2) The evaluation filter is used in order to specify pattern evaluation values in an evaluation value calculation process (step S67), an evaluation value comparison process (step S68) and a saved pattern/evaluation value updating process (step S69). For the evaluation filter, different filters for each tone can be set to. The details of this are described below.

The initial pattern generation process in step S63 in FIG. 9 sets an initial pattern for optimizing the pattern (dot arrangement). The pattern is set in accordance with the following procedure.
(Procedure 1) The number of dots and blank spaces required for the tone is determined. For example, in the case of an 8-bit tone L, the number of dots required is $(L/2^8) \times$ matrix size.
(Procedure 2) Random numbers of the same size as the matrix size are generated.
(Procedure 3) Dots are arranged in accordance with the rules indicated below.
[Rule 1] In the case of a tone equal to or lower than the initial tone (L0): The number of dots indicated by (Procedure 1) are arranged, in sequence from the location having the highest random number value, in the region where interchanging of dots is permitted under the restrictions, and the remaining locations are all set to blank spaces.
[Rule 2] In the case of a tone higher than the initial tone (L0): The number of white spaces indicated by (Procedure 1) are arranged, in sequence from the location having the highest random number value, in the region where interchanging of dots is permitted under the restrictions, and the remaining locations are all set to dots.

In step S64, the value (n) of the counter is reset to "0".

In the pixel interchange process in step S66, the dot pattern is updated in accordance with the flows shown in FIGS. 10A to 10C. In FIGS. 10A to 10C, three flowcharts are shown as an example. In each of these flowcharts, the dot pattern is firstly multiplied by an evaluation filter (convolved), to calculate a density distribution for evaluation. The flowcharts have in common a basic sequence of subsequently interchanging dots of high density which are located in a region satisfying the interchange restrictions, with blank spaces having low density.

FIG. 10A shows a flow in which the process described above is carried out in one step. FIGS. 10B and 10C show examples in which the processing is carried out in two steps. The pixel interchange process (step S66) is repeated in the course of optimization, but it is possible to adopt a composition in which only the "pixel interchange process 1" shown in FIG. 10A is carried out at all times, or to randomly select the pixel interchange processes 1 to 3, including the "pixel interchange process 2" shown in FIG. 10B and the "pixel interchange process 3" shown in FIG. 10C. The pixel interchange process 1 in FIG. 10A may be composed so as to be used frequently in the initial stage of optimization, since the number of convolutions of the evaluation filter is lower than the other processes 2 to 3 and the calculation is faster. Furthermore, the selection methods in processes 1 to 3 can be changed for each tone.

The evaluation value calculation process in step S67, the evaluation value comparison process in step S68 and the saved pattern/evaluation value updating process in steps S69 to S73 shown in FIG. 9 are as follows.

The evaluation value calculation process (step S67) multiplies (convolves) the evaluation filter and the dot pattern converted by the pixel interchange process in step S66, and calculates a density distribution for evaluation. The standard deviation of the density distribution is calculated and set as the evaluation value. In steps S66 to S72, the pixel interchange process (step S66) and the evaluation value calculation process (step S67) are repeated, and if the evaluation value is improved in a comparison of the evaluation values (step S68), then the evaluation value is saved together with the corresponding pattern (step S69). In subsequent repetitions, the saved evaluation value and the calculated evaluation value are compared (step S68) and it is judged whether or not the improvement is made.

By repeating the pixel interchange process and the evaluation value calculation process described above (steps S66 to S72) until there is no further updating of the pattern, the pattern for the corresponding tone is optimized in respect of the evaluation value. The tone pattern obtained by optimization is saved (step S73) and the processing is terminated.

Evaluation Filter, Restrictions and Corresponding Pattern

A method of setting the evaluation filter required in order to create a pattern having the frequency characteristics shown in FIG. 3 is described below. Since the pattern characteristics vary depending on the tone level, it is necessary to change the corresponding evaluation filter as well. Below, the pattern for each tone and the corresponding filter are described.

Initial Tone

As described in relation to FIG. 3, for the initial tone, a pattern which achieves the characteristics of the mask pattern according to the present embodiment is generated. In other words, FIG. 2 is a schematic drawing of a real space of the mask pattern, and FIG. 3 shows the frequency characteristics of the mask pattern.

In the pattern in FIG. 2, a plurality of lateral lines having a height of 1 pixel (indicated by the unit [px]) are arranged in the lateral direction (the perpendicular direction), the lateral lines being arranged with gaps of 1 px therebetween (every 2 px) in the longitudinal direction (conveyance direction), and a staggered pattern is removed from these lines. The lengths of the segments of the respective lateral line are not limited in particular, and may be set to a suitable length that is 2 px or greater.

With regard to the frequency characteristics, this pattern has a peak frequency (Nyquist frequency) in the conveyance direction, and a maximum in the region of the intermediate frequency component in the perpendicular direction; the frequency components other than this, in particular the low frequency components, are suppressed (the components kx=0 and ky=0 which indicate the average density are ignored here; see the center of FIG. 3).

Figure 11:
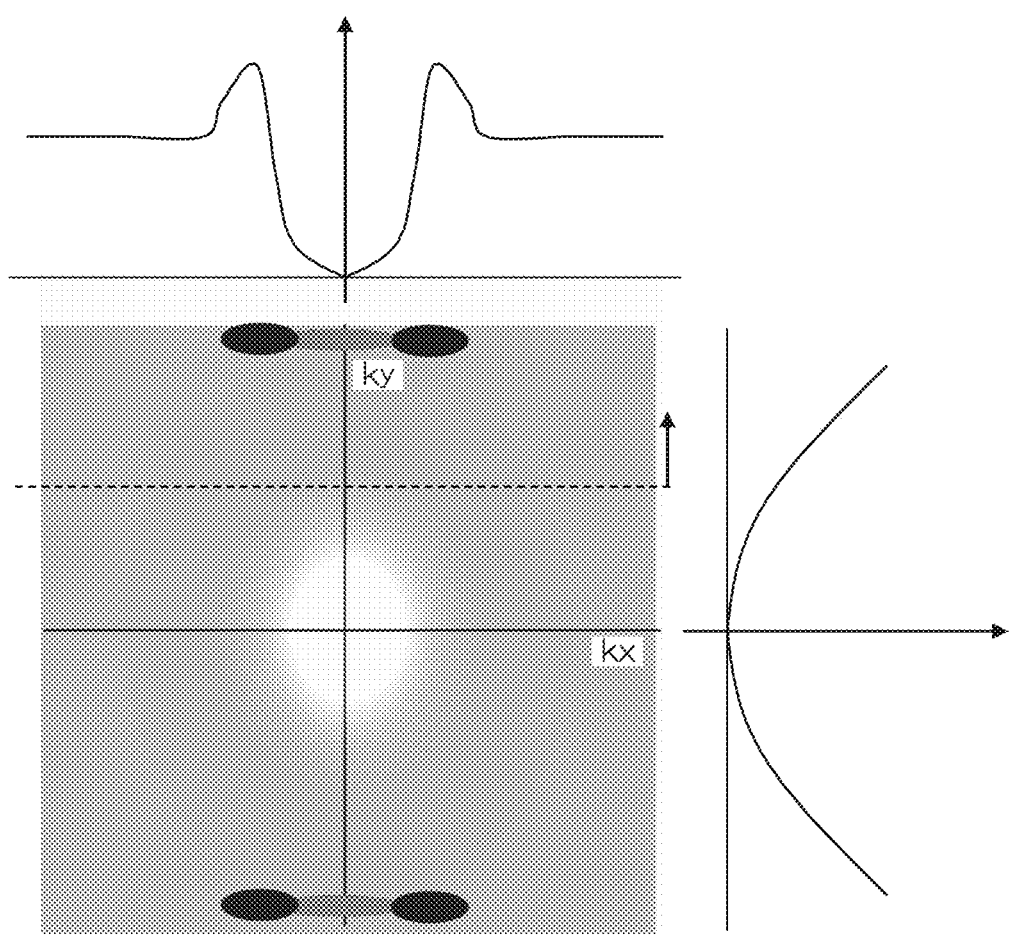
FIG. 11 is an illustrative diagram of the specific features of frequency characteristics of a mask pattern.

As shown in FIG. 11, the frequency characteristics have features from the following viewpoints.

(1) When the frequency components are integrated in the x direction, the graph indicating the integration results has a maximum in the vicinity of the Nyquist frequency in the y direction (see the graph shown on the right-hand side in FIG. 11).

(2) When the frequency components are integrated in a frequency range to the higher frequency side of ½ of the Nyquist frequency (when the integration is carried out for the region above the dotted line in FIG. 11), then in the graph showing the corresponding integration result, the component of wavenumber 0 in the x direction is suppressed. Furthermore, in the x direction, there is a maximum to the lower frequency side of the Nyquist frequency (in the intermediate frequency range), (see the graph on the upper side in FIG. 11). Here, "suppressed" means that the corresponding value is close to zero.

(3) The frequency characteristics are blue noise characteristics in the y direction and green noise characteristics in the x direction. In blue noise characteristics, the component amount (intensity) becomes greater, further toward the high-frequency side. In green noise characteristics, there is a peak at a particular frequency (intermediate frequency component).

Evaluation Filter Used for L0 Tone

Figure 12:
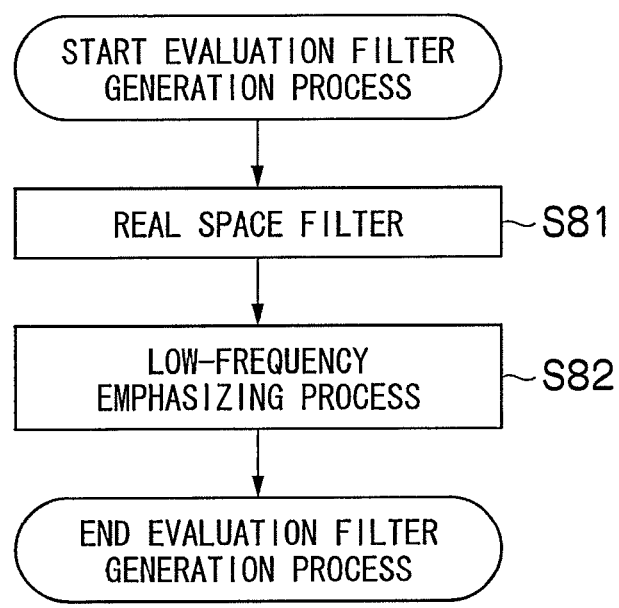
FIG. 12 is a flowchart of an evaluation filter generation process.

An evaluation filter for generating a pattern of this kind is created in accordance with the flowchart shown in FIG. 12. In other words, firstly, a filter is designed in a real space (step S81). Basically, this is a function which decreases as a function of distance from the center (namely, the component at (0,0) when convolved).

However, in the present embodiment, since it is sought to achieve high frequency characteristics (with a maximum at the Nyquist frequency in the conveyance direction) in the conveyance direction and to achieve low frequency characteristics in the perpendicular direction, then as exemplified in FIG. 13, the central pixel line (the pixel line in the lateral direction centered on "10") is set to small values compared to the pixel lines above and below it, and furthermore the lines two above and two below the central line (the lines indicated by gray shading at a gap of one line above and below the central pixel line) are also set to small values.

An evaluation filter can be generated by also carrying out a low-frequency emphasizing process with respect to the real space filter having these characteristics (step S82 in FIG. 12). By using the evaluation filter obtained in this way to optimize the pattern for intermediate tones, it is possible to generate a mask pattern having desired frequency characteristics.

The mask pattern according to the present embodiment needs to be arranged at the Nyquist frequency in the conveyance direction, and therefore a tone at about 50% is selected as the initial tone L0 in the present embodiment. If the initial tone is at 50% exactly, then the phase in the conveyance direction can be made to coincide readily over a broad range. Banding becomes more liable to occur in this case, and therefore it is desirable to shift the tone slightly from 50%. The pattern shown in FIG. 11 is generated at (136/256)×100 [%]=53.125%, but the value used is not limited to this.

Other Tones

For other tones apart from the initial tone, the characteristics of the initial tone are reflected due to the dithering characteristics. More specifically, under to the restrictions (restriction conditions), a pattern which includes the pattern of the initial tone is employed. Therefore, it is possible to achieve desired characteristics using any evaluation filter, to a certain extent.

However, in the shadow regions and the highlight regions, it is desirable in terms of image quality for the dots to be as distributed as possible. Therefore, it is desirable to create the evaluation filter by using a real space filter which is isotropic and decreases as a function of the distance from the center, and by multiplying a low-frequency filter by this real space filter.

Restrictions

If the evaluation filter described above is set, then it is possible to achieve desired characteristics by setting no restrictions in respect of the initial tone, and for the other tones, creating dither based only on the restrictions imposed by the relationship of the tones, which are generally required in a dither matrix.

Moreover, in a further embodiment, by setting lines of 1-on 1-off as the restrictions for the initial tone, it is possible to achieve a pattern having similar characteristics.

The mask pattern may use a pattern for the initial tone L0, or a pattern for a periphery (approximate) tone. In either case, it is possible to achieve desired characteristics.

Concrete Example of Method of Implementing Half-Toning Process

Second Method: Method Combining Dither Matrix and Error Diffusion Method

Next, an example of a half-toning process for carrying out quantization by combined use of a dither matrix and error diffusion will be described.

As shown in FIG. 7, the region is divided into two parts by a binary mask pattern having high-frequency characteristics in the conveyance direction and low-frequency characteristics in the perpendicular direction. The two divided regions are respectively called region A and region A'. These regions may be changed for each tone. For example, the dither matrix generated in FIG. 7 has the frequency characteristics described above in the intermediate tone range, and therefore the region A may be adjusted by altering the threshold value which is compared with the dither matrix, for each respective tone.

Figure 14:
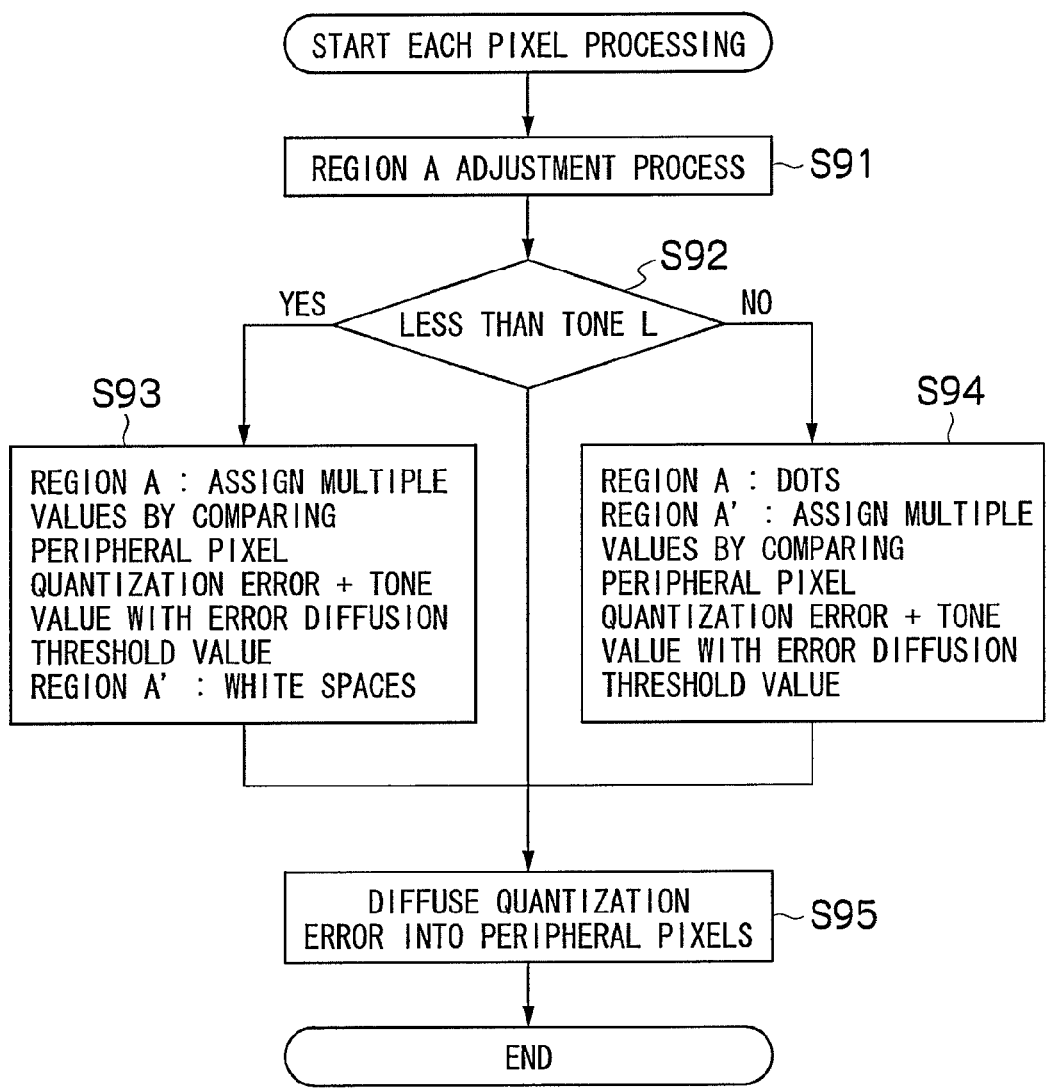
FIG. 14 is a flowchart of each pixel processing (quantization processing)

FIG. 14 is a flowchart of a quantization process for each pixel. The "region A adjustment process" indicated by step S91 in FIG. 14 is a processing step for adjusting the region A by altering the threshold value which is compared with the dither matrix, for each tone.

At step S92, it is judged whether or not the tone value of a pixel under consideration (a pixel being processed) is less than the tone L. The tone L which is used as this judgment reference is the intermediate tone value employed when creating the binary filter pattern in FIG. 7.

If the tone value of the pixel under consideration is less than tone L, in other words, in the region from the highlights to the intermediate tones, a YES judgment is returned at step S92, and the procedure then advances to step S93.

At step S93, multiple-value conversion processing is carried out inside the region A, and blank white dots (which correspond to no droplet) are arranged in the region A'. The multiple-value conversion processing carried out in the region A is performed on the basis of the result of calculating the sum of the quantization error (peripheral error) which is diffused from peripheral pixels and the tone value (original tone value) of the pixel under consideration, and comparing this sum signal value with an error diffusion threshold value (threshold value for quantization judgment).

On the other hand, in the judgment at step S92, if the tone value of the pixel under consideration is equal to or greater than the tone L, in other words, in the intermediate tone to shadow regions, a NO verdict is returned at step S92, and the procedure then advances to step S94.

At step S94, dots are arranged as "droplet present" in the region A, and in the region A', multiple values are assigned (multiple value conversion is carried out) by comparison with the error diffusion threshold value, similarly to the description given above.

For instance, in order to achieve <Example 1> in FIG. 6, the multiple value conversion of the region A which is lower than tone L is processing for selecting small droplets or blank white dots (step S93 in FIG. 14). Furthermore, at or above the tone L, small droplets are arranged in region A, while in the region A', a large droplet or a blank white dot is selected as the multiple value conversion result (step S94).

Furthermore, in order to achieve <Example 2> in FIG. 6, in the tone range at or below K (where K is an integer satisfying 0<K<L), the region A is adjusted to become narrower, and the region A is binarized, using a small droplet or a blank white dot. Thereupon, in the tonal region at or above K and below L, multiple values are assigned (i.e. multiple conversion is performed), using a small droplet or a large droplet, in region A. In this case, region A may be adjusted to a broader size, or may be fixed to the same region as in the tonal region at or below K. It is possible to control the occurrence ratio of large droplets and small droplets in accordance with the breadth of the region A and the tone values.

After performing multiple value conversion in step S93 or S94, the difference (quantization error) between the "peripheral pixel quantization error+tone value" of the pixel under consideration and the tone value corresponding to the selected dot (including no droplet) is calculated, and this quantization error is diffused into the peripheral pixels that have not yet been processed (step S95).

Figure 15:
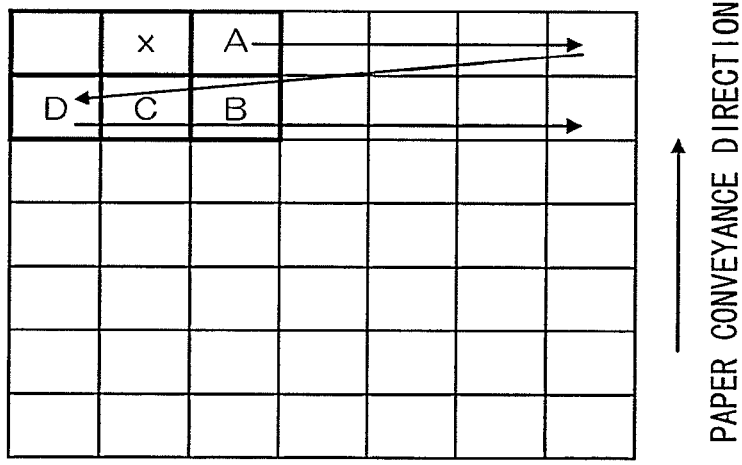
FIG. 15 is an illustrative diagram showing an example of an error diffusion matrix based on an error diffusion method.

FIG. 15 shows an example of an error diffusion matrix. The "x" in FIG. 15 represents the position of a pixel that is being quantized, and the arrow indicates the sequence of the quantization processing. The quantization errors are distributed respectively into the four unprocessed pixels which are adjacent to the pixel under consideration (the pixel x being quantized) (in other words, into the pixels laterally to the right, diagonally down and to the right, directly below, and diagonally down and to the left of the pixel in question). Of the components A to D of the error diffusion matrix which defines the distribution ratio of the error, the error component distributed in the lateral direction ("A" in FIG. 15) is desirably apportioned a larger value than the value obtained by diffusing the error equally (for example, four equal values each having an apportionment ratio of 1/4). In other words, in the case of FIG. 15, desirably, the "A" component has a value larger than 0.25. By apportioning a larger quantization error in the lateral direction (x direction), the dots are distributed in the lateral direction, the overall distribution is improved, and granularity is improved.

Concrete Example of Flowchart of Quantization Processing

Here, an example of quantization processing using a combination of a dither matrix and error diffusion is described.

Figure 16:
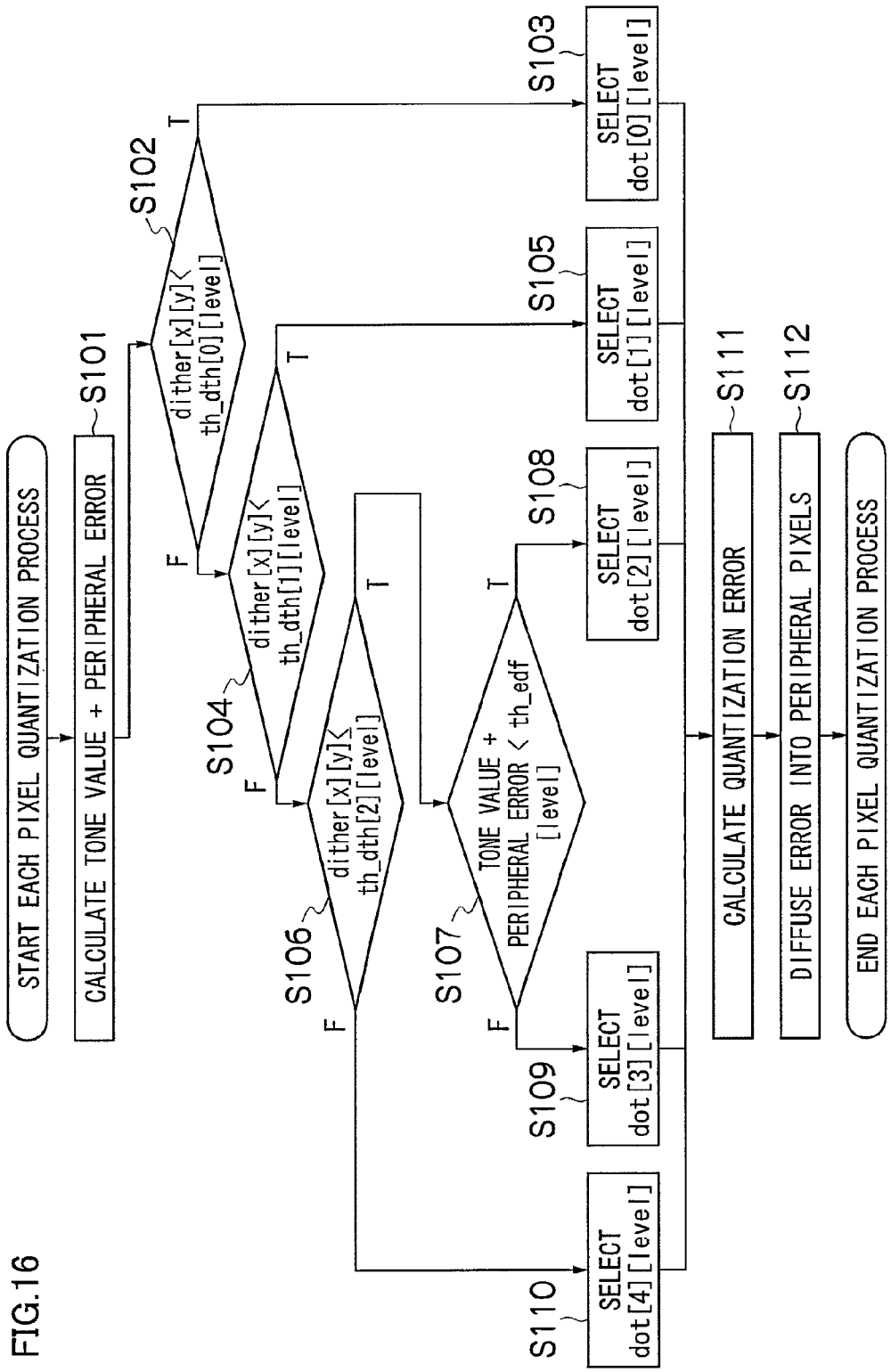
FIG. 16 is a flowchart showing a concrete example of a quantization process.

FIG. 16 is a flowchart showing quantization processing for each pixel according to the present embodiment. In FIG. 16, dither [x][y] represents a component of a two-dimensional dither matrix. th_dth[i] [level] indicates a threshold value for comparing with the dither matrix (i=0, 1, 2). th_edf[level] indicates an error diffusion threshold value. dot [j] [level] is associated with a dot size of one of {no droplet, small droplet, medium droplet and large droplet} with each tone value (level) (j=0, 1, 2, 3).

When quantization processing of each pixel is started, initially, a tone value including peripheral error is calculated by finding the sum of the original tone value of the object pixel, and the peripheral error that has been diffused into that object pixel by error diffusion (step S101).

Next, the region of the image is divided by comparing the dither matrix value (dither [x][y]) and the threshold value th_dth [i] [level]. The threshold value th_dth [i] [level] is set for each tone value (level) of the object pixel, and is stored previously in a prescribed memory. Here, the image region is divided into four regions, using a first threshold value th_dth [0] [level], a second threshold value th_dth [1] [level], and a third threshold value th_dth [2] [level].

Firstly, the value of the dither matrix and the first threshold value th_dth [0] [level] are compared (step S102). If, as a result of the comparison, the value of the dither matrix is smaller, then the dot size specified by dot [0] [level] is selected (step S103).

At step S102, if the dither matrix value is equal to or greater than the first threshold value, then subsequently the dither matrix value and the second threshold value th_dth [1] [level] are compared (step S104). If, as a result of the comparison, the value of the dither matrix is smaller, then the dot size specified by dot [1] [level] is selected (step S105).

At step S104, if the dither matrix value is equal to or greater than the second threshold value, then subsequently the dither matrix value and the third threshold value th_dth [2] [level] are compared (step S106). If the dither matrix value is equal to or less than the third threshold value th_dth [2] [level], then the procedure advances to step S107, and the tone value including the peripheral error is compared with the error diffusion threshold value th_edf [level] (step S107). The error diffusion threshold value th_edf [level] is also set for each tone value of the object pixel, and is stored previously in a prescribed memory. If, as a result of the comparison in step S107, the tone value including the peripheral error is smaller than the error diffusion threshold value, then the dot size specified by dot [2] [level] is selected (step S108).

On the other hand, at step S107, if the tone value including the peripheral error is equal to or greater than the error diffusion threshold value, then the dot size specified by dot [3] [level] is selected (step S109). In this way, in the region where the dither threshold value is equal to or lower than the third threshold value (and not less than the second threshold value), binarization processing by an error diffusion method is carried out.

Furthermore, at step S106, if the value of the dither matrix is greater than the third threshold value, the dot size specified by dot [4] [level] is selected (step S110).

The dot size of dot [j] [level] can be specified appropriately for each tone value. For instance, for a particular tone value, the following sizes can be specified: dot [0] [level]: small droplet; dot [1] [level]: medium droplet; dot [2] [level]: no droplet; dot [3] [level]: large droplet; and dot [4] [level]: large droplet. Basically, dot [3] [level] should be greater than dot [2] [level] (dot [3] [level]>dot [2] [level]), and the values are specified in such a manner that if the quantization error is large, then a large dot is ejected, whereas if the quantization error is small, then a small dot is ejected.

A concrete example relating to a case for achieving <Example 1> in FIG. 6 is as follows.

(1) Multiple value conversion in the region A lower than tone L involves processing for selecting a small droplet or a blank white dot (step S93 in FIG. 14). In other words, in the flowchart in FIG. 16, the values are set as th_dth [0] [level]=th_dth [1] [level]=0 (not used). In this case, since steps S103 and S105 are not used, then dot [0] [level] and dot [1] [level] can be set to any.

th_dth [2] [level] is set to a threshold value which achieves region A. In this region, processing of selecting a small droplet or a blank white dot is carried out, and therefore dot [3] [level]=a small droplet and dot [2] [level]=no droplet are set.

In the region A' apart from the region A, no droplets are ejected, and therefore dot [4] [level]=no droplet is set.

(2) Furthermore, at or above the tone L, small droplets are arranged in region A, while in the region A', a large droplet or a white dot is selected as the multiple value conversion result (step S94 in FIG. 14). In other words, in order to set region A, th_dth [0]=0 (not used) is set in the flowchart in FIG. 16. Furthermore, th_dth [1] is set to the threshold value of region A, and dot [1] [level] is set to a small droplet. In order to convert a large droplet or blank white dot to multiple values in the region A', th_dth [2] [level] is set to dither max value (i.e. A' region), dot [3] is set to a large droplet and dot [2] is set to blank white.

Next, a concrete example for achieving <Example 2> in FIG. 6 is described.

In order to achieve <Example 2> in FIG. 6, in the tone range at or below K (where K is an integer satisfying 0<K<L), the region A is adjusted to become narrower, and binarization using a small droplet or a blank white dot is applied in the region A. The conditions in this case are similar to when the tone is less than the tone L in <Example 1> above (see (1) above). Since the region A is narrow, however, the value of th_dth [2] varies.

Furthermore, in the tonal region at or above K and below L, multiple values are assigned, using a small droplet or a large droplet, in region A. In this case, region A may be adjusted to a broader size, or may be fixed to the same region as in the tonal region at or below K. The threshold values are set to th_dth [0]=th_dth[1]=0, and region A is set using th_dth [2]. This region is converted to multiple values using small droplet/large droplet, and therefore dot [3] [level] is set to a large droplet and dot [2] [level] is set to a small droplet. In the region A', no droplets are ejected, and dot [4] is set to no droplet.

In this way, quantization corresponding to the divided regions is carried out. After selecting the dot size for the object pixel as described above, the quantization error is calculated (step S111). The quantization error is error which occurs when a tone value is including the peripheral error is quantized, and this is the difference between the tone value including the peripheral error and the quantization threshold value. The quantization threshold values are tone values associated respectively with dot [0] [level], dot [1] [level], dot [2] [level], dot [3] [level] and dot [4] [level].

The quantization error calculated in this way is diffused into the peripheral pixels in accordance with the prescribed error diffusion matrix (step S112). Thereupon, by shifting the pixel that is the object of quantization to an adjacent pixel and performing similar processing, quantization can be carried out for all of the pixels.

The recording ratios of dot [0] [level], dot [1] [level] and dot [4] [level] of each region corresponding to steps S103, S105 and S110 are specified in accordance with the dither matrix, and the other regions are specified by binarization with an error diffusion method (steps S108, S109). By carrying out quantization in this way, it is possible to uniquely determine the recording ratios of the four values for each tone.

In the present embodiment, each threshold value th_dth [i] [level] for dividing the region uses a threshold value at the original tone value of the object pixel, but it is also possible to use a threshold value at the tone value including peripheral error.

Concrete Example of Dither Matrix

Figure 17:
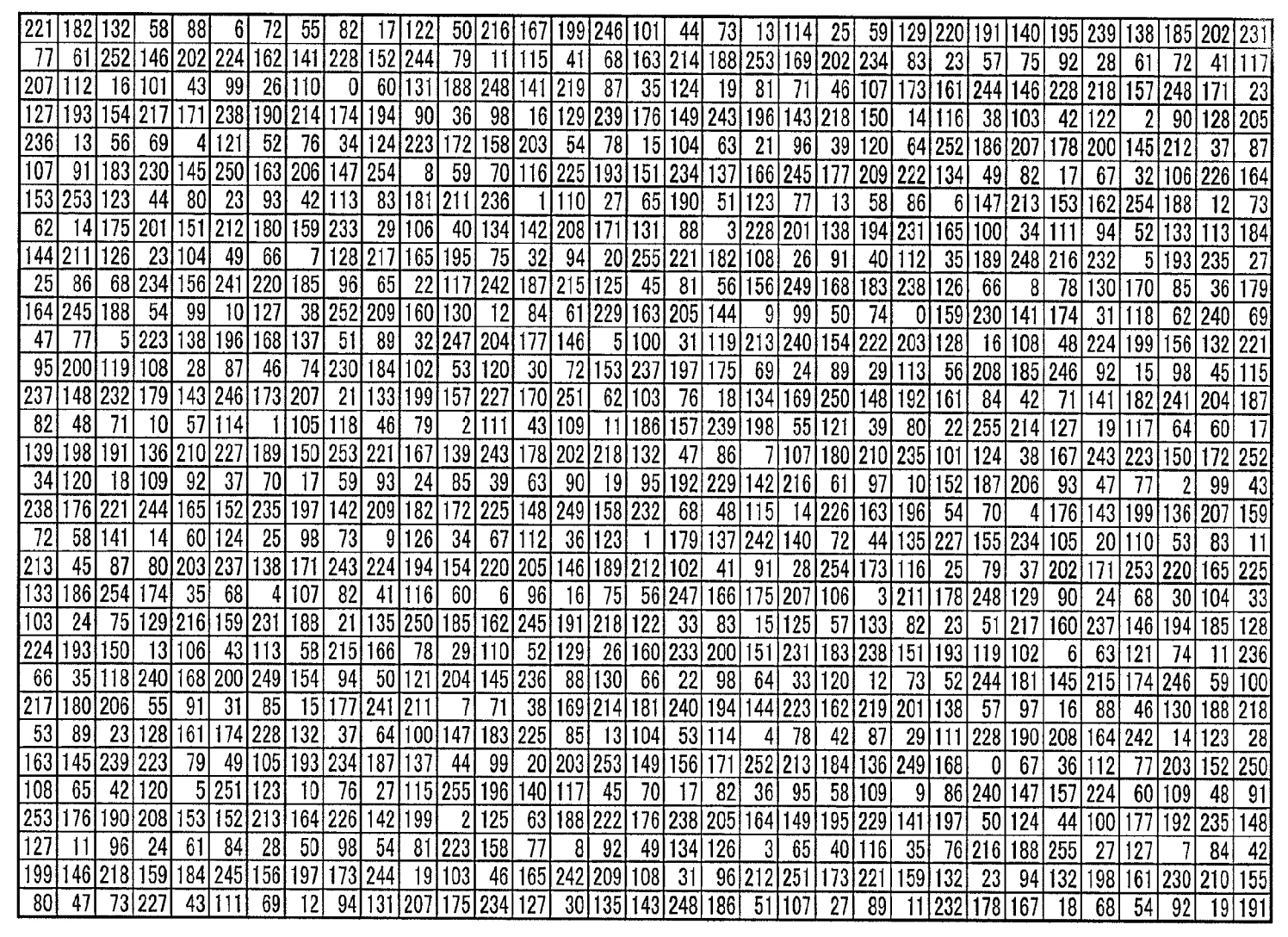

For reference purposes, a concrete example of a dither matrix created in accordance with the present embodiment is shown in FIG. 17. A dither matrix which was created in actual practice had a matrix size of 192×192, but for the purposes of the drawing, only a "32×32" region of a portion of the matrix (the top left portion of the whole matrix) is depicted.

Composition of Image Forming Apparatus
According to the Present Embodiment

Figure 18:
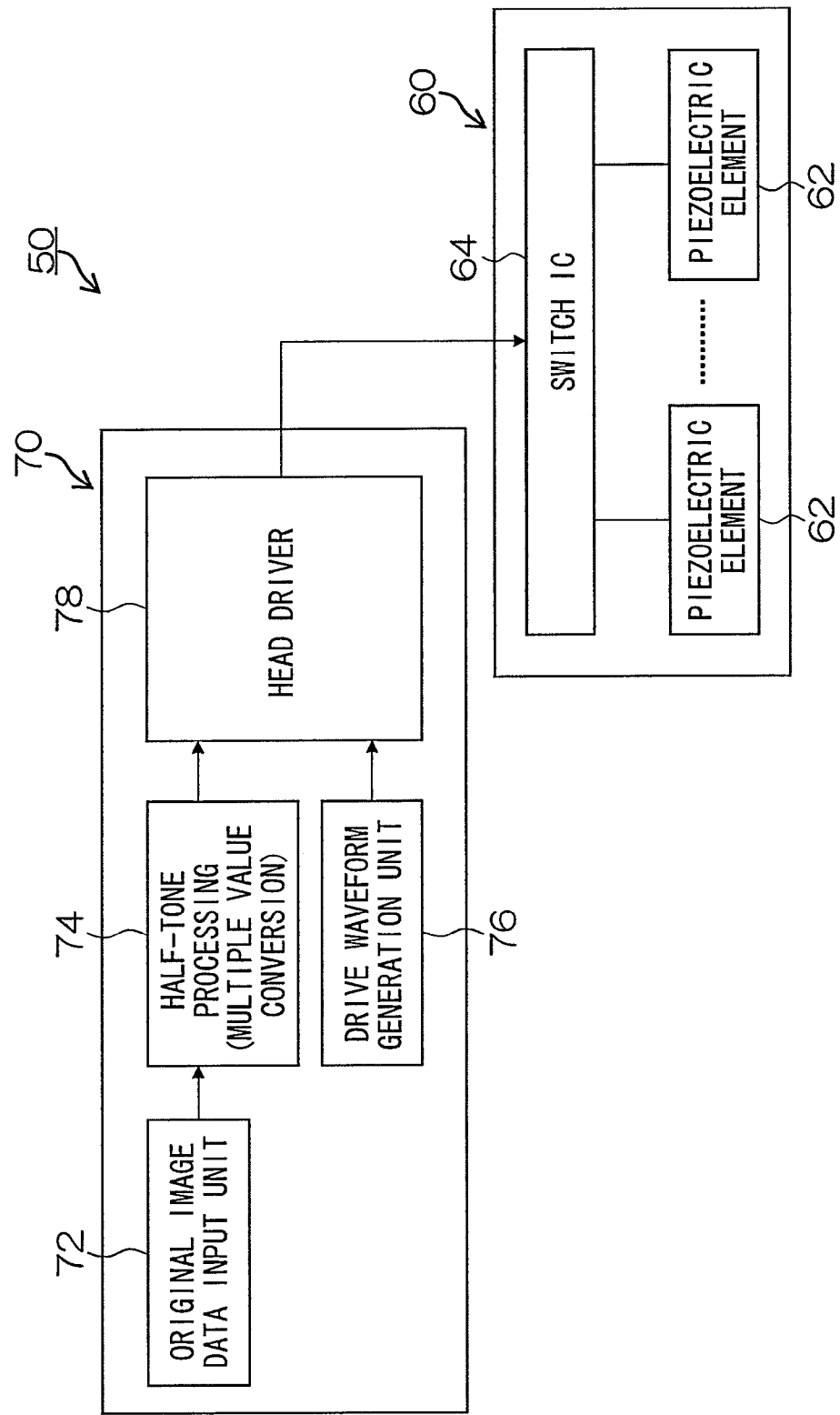
FIG. 18 is a block diagram showing a composition of a control system of the image forming apparatus relating to an embodiment.

FIG. 18 is a block diagram showing a composition of main components of an image forming apparatus relating to the present embodiment. The image forming apparatus 50 includes a recording head 60, and a head control apparatus 70 which controls recording operations of the recording head 60.

The recording head 60 includes a plurality of piezoelectric elements 62 forming ejection energy generating elements which are provided so as to correspond to the nozzles respectively, and a switch IC 64 which switches each piezoelectric element 62 between driving and non-driving.

The head control apparatus 70 includes an original image data input unit 72 which functions as an input interface unit for receiving original image data (multiple-tone image data) that is to be recorded, and a half-tone processing unit 74 (corresponding to a multiple value conversion device") which carries out quantization processing of the input original image data. Furthermore, the head control apparatus 70 includes a drive waveform generation unit 76 and a head driver 78.

The original image data may be image data which has been converted to each ink color, or RGB image data before conversion to the respective ink colors. Color conversion processing, pixel number conversion processing and gamma conversion processing are carried out on the original image data, according to requirements.

The half-tone processing unit 74 is a signal processing device which converts the original image data (density data) into binary or multiple-value dot data. The half-tone processing device may employ a mode using a dither matrix as described above, or a mode which combines dither and error diffusion, or the like. The half-toning process generally converts tonal image data having M values (M≧3) into tonal image data having N values (N<M). In the simplest example, the image data is converted into dot image data having 2 values (dot on/dot off), but in a half-toning process, it is also possible to perform quantization in multiple values which correspond to different types of dot size (for example, three types of dot: a large dot, a medium dot and a small dot).

More specifically, the half-tone processing unit 74 according to the present embodiment quantizes input tone to n values (n−1 droplet sizes plus no droplet) which correspond to n−1 different droplet sizes (where n is an integer greater than 2). The recording ratio which indicates in what ratio the dots of n different sizes are to be ejected for each printable pixel is specified uniquely for each tone.

The binary or multiple-value image data (dot data) obtained in this way is used as ink ejection control data (droplet ejection control data) for driving (on) or not driving (off) the respective nozzles and for controlling the droplet volume (dot size) in the case of multiple-value data. The dot data generated by the half-tone processing unit 74 (droplet ejection control data) is supplied to the head driver 78 and the ink ejection operation of the recording head 60 is controlled thereby.

The drive waveform generation unit 76 is a means which generates a drive voltage signal waveform for driving the piezoelectric elements 62 corresponding to the nozzles of the recording head 60. The waveform data of the drive voltage signal is stored previously in a storage device, such as a ROM, and waveform data to be used is output as and when required. The signal (drive waveform) generated by the drive waveform generation unit 76 is supplied to the head driver 78. The signal output from the drive waveform generation unit 76 may be digital waveform data or an analog voltage signal.

The inkjet image forming apparatus 50 shown in the present embodiment employs a drive method in which a common drive power waveform signal is supplied to the piezoelectric elements 62 of the recording head 60 via the switch IC 64, and by switching the switching elements connected to the individual electrodes of the piezoelectric elements 62 on and off according to ejections timings of the respective nozzles, ink can be ejected from the nozzles corresponding to the respective piezoelectric elements 62.

A combination of the original image data input unit 72 and the half-tone processing unit 74 in FIG. 18 corresponds to the "image processing apparatus".

Benefits of the Present Embodiment

The image processing technology described in the present embodiment can be applied to apparatus compositions such as those described below.
[1] An image forming apparatus which carries out printing (recording) in one scan (one movement) by moving a recording head and a print medium (recording medium) relatively with respect to each other.
[2] An image forming apparatus in which, if the direction of relative movement of the print medium with respect to the recording head is taken to be the "conveyance direction" (y direction), then the landing time difference between adjacent pixels in the conveyance direction is shorter than the landing time difference between adjacent pixels in the conveyance perpendicular direction (x direction).
[3] An image forming apparatus in which the printing accuracy in the conveyance direction (landing position accuracy) is high compared to the accuracy in the perpendicular direction.
[4] An image forming apparatus using a recording head having a two-dimensional nozzle arrangement which has no redundancy of the nozzles in the conveyance direction. More specifically, this is an image forming apparatus having a two-dimensional nozzle arrangement in which, in terms of the nozzles which carry out recording of pixels in the perpendicular direction (x direction), only one nozzle is assigned to each one pixel, and there does not exist a plurality of nozzles which perform recording of the same pixel position in the x direction.

Concrete Compositional Example of the Image Forming Apparatus

Figure 19:
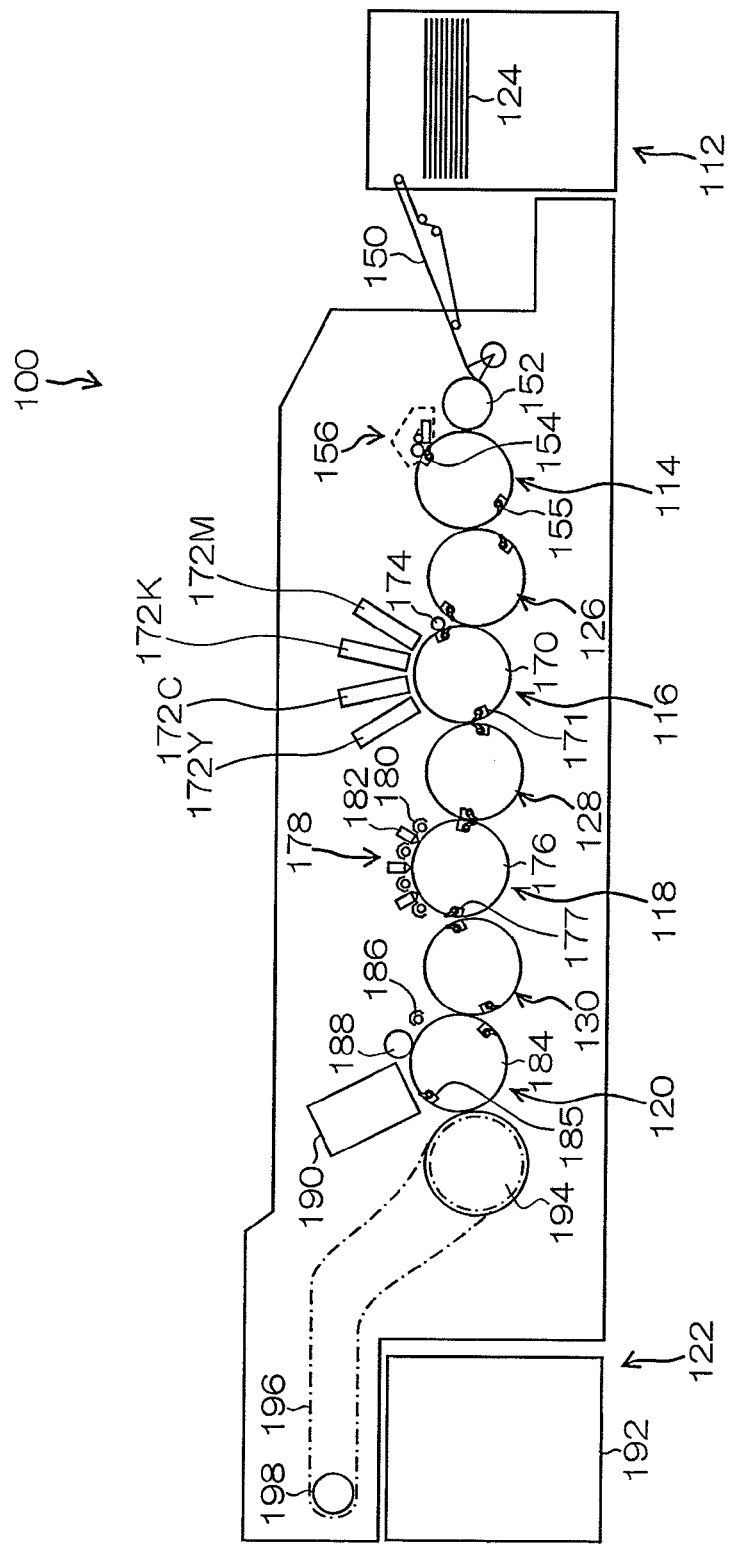
FIG. 19 is a general schematic drawing of an inkjet recording apparatus relating to an embodiment of the present invention.

FIG. 19 is a general schematic drawing showing an example of the composition of an inkjet recording apparatus relating to an embodiment of the present invention. The inkjet recording apparatus 100 according to the present embodiment is principally constituted by a paper supply unit 112, a treatment liquid deposition unit (pre-coating unit) 114, an image formation unit 116, a drying unit 118, a fixing unit 120 and a paper output unit 122. The inkjet recording apparatus 100 is an inkjet recording apparatus using a single pass method, which forms a desired color image by ejecting droplets of inks of a plurality of colors from long inkjet heads 172M, 172K, 172C and 172Y onto a recording medium 124 (called "paper" below for the sake of convenience) held on a drum (image formation drum 170) of an image formation unit 116. The inkjet recording apparatus 100 is an image forming apparatus of a drop on-demand type employing a two-liquid reaction (aggregation) method in which an image is formed on a recording medium 124 by depositing a treatment liquid (here, an aggregating treatment liquid) on a recording medium 124 before ejecting droplets of ink, and causing the treatment liquid and ink liquid to react together.

Paper Supply Unit

A cut sheet recording medium 124 is stacked in the paper supply unit 112 and the recording medium 124 is supplied, one sheet at a time, to the treatment liquid deposition unit 114, from a paper supply tray 150 of the paper supply unit 112. In the present embodiment, cut sheet paper (cut paper) is used as the recording medium 124, but it is also possible to adopt a composition in which paper is supplied from a continuous roll (rolled paper) and is cut to the required size.

Treatment Liquid Deposition Unit

The treatment liquid deposition unit 114 is a mechanism which deposits treatment liquid onto a recording surface of the recording medium 124. The treatment liquid includes a coloring material aggregating agent which aggregates the coloring material (in the present embodiment, the pigment) in the ink deposited by the image formation unit 116, and the separation of the ink into the coloring material and the solvent is promoted due to the treatment liquid and the ink making contact with each other.

The treatment liquid deposition unit 114 includes a paper supply drum 152, a treatment liquid drum (also called a "pre-coating drum") 154 and a treatment liquid application apparatus 156. The treatment liquid drum 154 is a drum which holds the recording medium 124 and conveys the medium so as to rotate. The treatment liquid drum 154 includes a hook-shaped gripping device (gripper) 155 provided on the outer circumferential surface thereof, and is devised in such a manner that the leading end of the recording medium 124 can be held by gripping the recording medium 124 between the hook of the holding device 155 and the circumferential surface of the treatment liquid drum 154. The treatment liquid drum 154 may include suction holes provided in the outer circumferential surface thereof, and be connected to a suctioning device which performs suctioning via the suction holes. By this means, it is possible to hold the recording medium 124 tightly against the circumferential surface of the treatment liquid drum 154.

The treatment liquid application apparatus 156 includes a treatment liquid vessel in which treatment liquid is stored, an anilox roller (dosing roller) which is partially immersed in the treatment liquid in the treatment liquid vessel, and a rubber roller which transfers a dosed amount of the treatment liquid to the recording medium 124, by being pressed against the anilox roller and the recording medium 124 on the treatment liquid drum 154. In the present embodiment, a composition is described which uses a roller-based application method, but the method is not limited to this, and it is also possible to employ various other methods, such as a spray method, an inkjet method, and the like.

The recording medium 124 onto which treatment liquid has been deposited by the treatment liquid deposition unit 114 is transferred from the treatment liquid drum 154 to the image formation drum 170 of the image formation unit 116 via the intermediate conveyance unit 126.

Image Formation Unit

The image formation unit 116 includes an image formation drum (also called "jetting drum") 170, a paper pressing roller 174, and inkjet heads 172M, 172K, 172C and 172Y. The composition of the recording head 60 and the composition of the head controller 70 shown in FIG. 18 are employed as the inkjet heads 172M, 172K, 172C, 172Y of the respective colors and the control apparatus for same.

Similarly to the treatment liquid drum 154, the image formation drum 170 includes a hook-shaped holding device (gripper) 171 on the outer circumferential surface of the drum. A plurality of suction holes (not illustrated) are formed in a prescribed pattern in the circumferential surface of the image formation drum 170, and the recording medium 124 is held by suction on the circumferential surface of the image formation drum 170 by suctioning air from these suction holes. The composition is not limited to one which suctions and holds the recording medium 124 by means of negative pressure suctioning, and it is also possible to adopt a composition which suctions and holds the recording medium 124 by means of electrostatic attraction, for example.

The inkjet heads 172M, 172K, 172C and 172Y are respectively full-line type inkjet recording heads having a length corresponding to the maximum width of the image forming region on the recording medium 124, and rows of nozzles (a two-dimensional nozzle arrangement) for ejecting ink arranged throughout the whole width of the image forming region are formed in the ink ejection surface of each head. The inkjet heads 172M, 172K, 172Y and 172Y are disposed so as to extend in a direction perpendicular to the conveyance direction of the recording medium 124 (the direction of rotation of the image formation drum 170).

Cassettes (ink cartridges) of the corresponding color ink are installed in the inkjet heads 172M, 172K, 172C and 172Y respectively. Ink droplets of the respective inks are ejected from the inkjet heads 172M, 172K, 172C and 172Y toward the recording surface of the recording medium 124 which is held on the outer circumferential surface of the image formation drum 170.

By this means, the ink makes contact with the treatment liquid that has previously been deposited on the recording surface, and the coloring material (pigment) dispersed in the ink is aggregated to form a coloring material aggregate. As one possible example of a reaction between the ink and the treatment liquid, in the present embodiment, bleeding of the coloring material, intermixing between inks of different colors, and interference between ejected droplets due to combination of the ink droplets upon landing are avoided, by using a mechanism whereby an acid is included in the treatment liquid and the consequent lowering of the pH breaks down the dispersion of pigment and causes the pigment to aggregate. In this way, flowing of coloring material, and the like, on the recording medium 124 is prevented and an image is formed on the recording surface of the recording medium 124.

The droplet ejection timings of the inkjet heads 172M, 172K, 172C and 172Y are synchronized with an encoder (not illustrated in FIG. 19; indicated by reference numeral 294 in FIG. 23) which determines the speed of rotation and is positioned on the image formation drum 170. An ejection trigger signal (pixel trigger) is issued on the basis of this encoder determination signal. By this means, it is possible to specify the landing position with high accuracy. Moreover, speed variations caused by inaccuracies (e.g. fluctuation) in the image formation drum 170, or the like, can be ascertained in advance, and the droplet ejection timings obtained by the encoder can be corrected, thereby reducing droplet ejection non-uniformities, regardless of inaccuracies (e.g. fluctuation) in the image formation drum 170, the accuracy of the rotational axle, and the speed of the outer circumferential surface of the image formation drum 170. Furthermore, maintenance operations such as cleaning the nozzle surfaces of the inkjet heads 172M, 172K, 172C and 172Y, ejecting ink of increased viscosity, and the like, are desirably carried out with the head unit withdrawn from the image formation drum 170.

Although the configuration with the CMYK standard four colors is described in the present embodiment, combinations of the ink colors and the number of colors are not limited to those. As required, light inks, dark inks and/or special color inks can be added. For example, a configuration in which inkjet heads for ejecting light-colored inks such as light cyan and light magenta are added is possible. Moreover, there are no particular restrictions on the sequence in which the heads of respective colors are arranged.

The recording medium 124 onto which an image has been formed in the rendering unit 116 is transferred from the rendering drum 170 to the drying drum 176 of the drying unit 118 via the intermediate conveyance unit 128.

Drying Unit

The drying unit 118 is a mechanism which dries the water content contained in the solvent which has been separated by the action of aggregating the coloring material, and includes a drying drum 176 and a solvent drying apparatus 178. Similarly to the treatment liquid drum 154, the drying drum 176 includes a hook-shaped holding device (gripper) 177 provided on the outer circumferential surface of the drum, and can hold the leading end portion of the recording medium 124 by this holding device 177.

The solvent drying apparatus 178 is disposed in a position opposing the outer circumferential surface of the drying drum 176, and is constituted by a plurality of halogen heaters 180 and hot air spraying nozzles 182 disposed respectively between the halogen heaters 180. It is possible to achieve various drying conditions, by suitably adjusting the temperature and air flow volume of the hot air flow which is blown from the hot air flow spraying nozzles 182 toward the recording medium 124, and the temperatures of the respective halogen heaters 180. The recording medium 124 on which a drying process has been carried out in the drying unit 118 is transferred from the drying drum 176 to the fixing drum 184 of the fixing unit 120 via the intermediate conveyance unit 130.

Fixing Unit

The fixing unit 120 is constituted by a fixing drum 184, a halogen heater 186, a fixing roller 188 and an in-line sensor 190. Similarly to the treatment liquid drum 154, the fixing drum 184 includes a hook-shaped holding device (gripper) 185 provided on the outer circumferential surface of the drum, and can hold the leading end portion of the recording medium 124 by this holding device 185.

By means of the rotation of the fixing drum 184, the recording medium 124 is conveyed with the recording surface facing to the outer side, and preliminary heating by the halogen heater 186, a fixing process by the fixing roller 188 and inspection by the in-line sensor 190 are carried out in respect of the recording surface.

The fixing roller 188 is a roller member for melting self-dispersing polymer micro-particles contained in the ink and thereby causing the ink to form a film, by applying heat and pressure to the dried ink, and is composed so as to heat and pressurize the recording medium 124. The recording medium 124 is sandwiched between the fixing roller 188 and the fixing drum 184 and is nipped with a prescribed nip pressure (for example, 0.15 MPa), whereby a fixing process is carried out.

Furthermore, the fixing roller 188 is constituted by a heating roller formed by a metal pipe such as an aluminum pipe, or the like, having good thermal conductivity, which internally incorporates a halogen lamp, and is controlled to a prescribed temperature (for example, 60° C. to 80° C.). By heating the recording medium 124 by means of this heating roller, thermal energy equal to or greater than the Tg temperature (glass transition temperature) of the latex contained in the ink is applied and the latex particles are thereby caused to melt. By this means, fixing is performed by pressing the latex particles into the undulations in the recording medium 124, as well as leveling the undulations in the image surface and obtaining a glossy finish.

The in-line sensor 190 is a reading device which measures an ejection failure check pattern, an image density, a defect in an image, and the like of an image (including a test pattern) recorded on the recording medium 124. A CCD line sensor, or the like, can be applied as the in-line sensor 190.

According to the fixing unit 120 having the composition described above, the latex is particles in the thin image layer formed by the drying unit 118 are heated, pressurized and melted by the fixing roller 188, and hence the image layer can be fixed to the recording medium 124.

Instead of an ink which includes a high-boiling-point solvent and polymer micro-particles (thermoplastic resin particles), it is also possible to include a monomer which can be polymerized and cured by exposure to ultraviolet (UV) light. In this case, the inkjet recording apparatus 100 includes a UV exposure unit for exposing the ink on the recording medium 124 to UV light, instead of a heat and pressure fixing unit (fixing roller 188) based on a heat roller. In this way, if using an ink containing an active light-curable resin, such as an ultraviolet-curable resin, a device which irradiates the active light, such as a UV lamp or an ultraviolet LD (laser diode) array, is provided instead of the fixing roller 188 for heat fixing.

Paper Output Unit

A paper output unit 122 is provided subsequently to the fixing unit 120. The paper output unit 122 includes an output tray 192, and a transfer drum 194, a conveyance belt 196 and a tensioning roller 198 are provided between the output tray 192 and the fixing drum 184 of the fixing unit 120 so as to oppose same. The recording medium 124 is sent to the conveyance belt 196 by the transfer drum 194 and output to the output tray 192. The details of the paper conveyance mechanism created by the conveyance belt 196 are not shown, but the leading end portion of a recording medium 124 after printing is held by a gripper of a bar (not illustrated) which spans across the endless conveyance belt 196, and the recording medium is conveyed above the output tray 192 due to the rotation of the conveyance belts 196.

Furthermore, although not shown in FIG. 19, the inkjet recording apparatus 100 according to the present embodiment includes, in addition to the composition described above, an ink storing and loading unit which supplies ink to the inkjet heads 172M, 172K, 172C and 172Y, and a device which supplies treatment liquid to the treatment liquid deposition unit 114, as well as including a head maintenance unit which carries out cleaning (nozzle surface wiping, purging, nozzle suctioning and the like) of the inkjet heads 172M, 172K, 172C and 172Y, a position determination sensor which determines the position of the recording medium 124 in the paper conveyance path, a temperature sensor which determines the temperature of the respective units of the apparatus, and the like.

Structure Example of Inkjet Head

Next, the structure of inkjet heads is described. The inkjet heads 172M, 172K, 172C and 172Y have the same structure, and a reference numeral 250 is hereinafter designated to any of the heads.

Figure 20A:
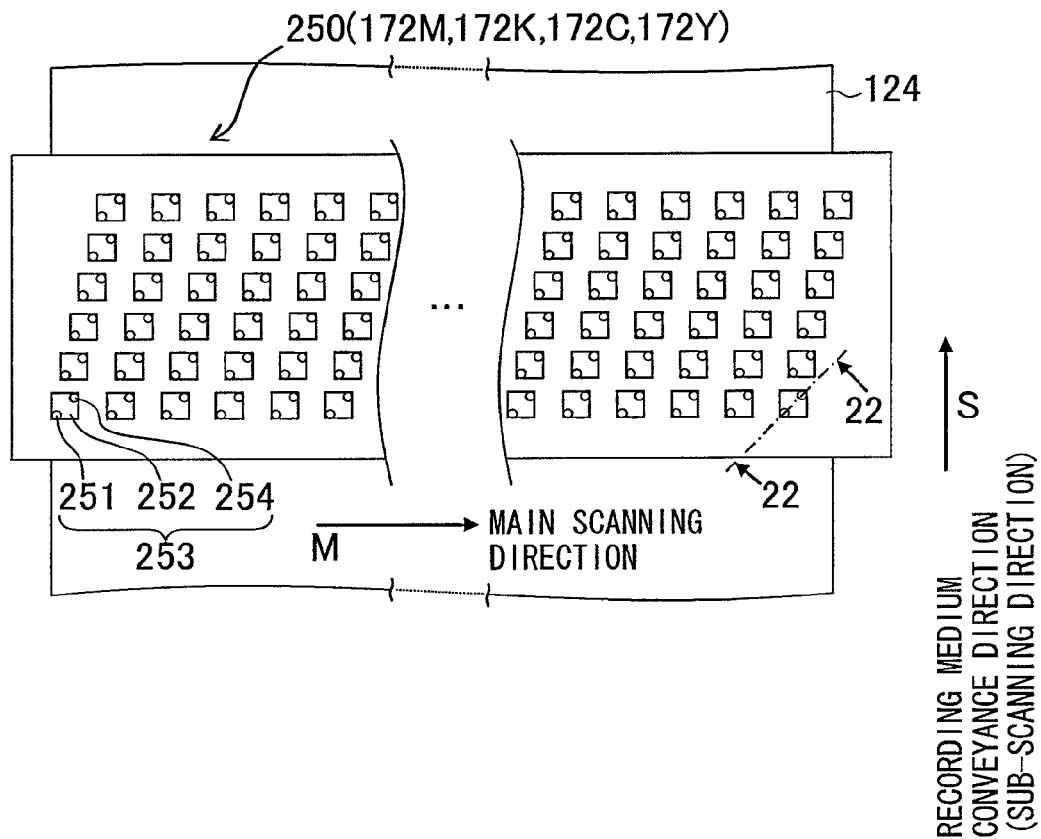
FIGS. 20A and 20B are plan view perspective diagrams showing an example of the composition of an inkjet head.
Figure 20B:
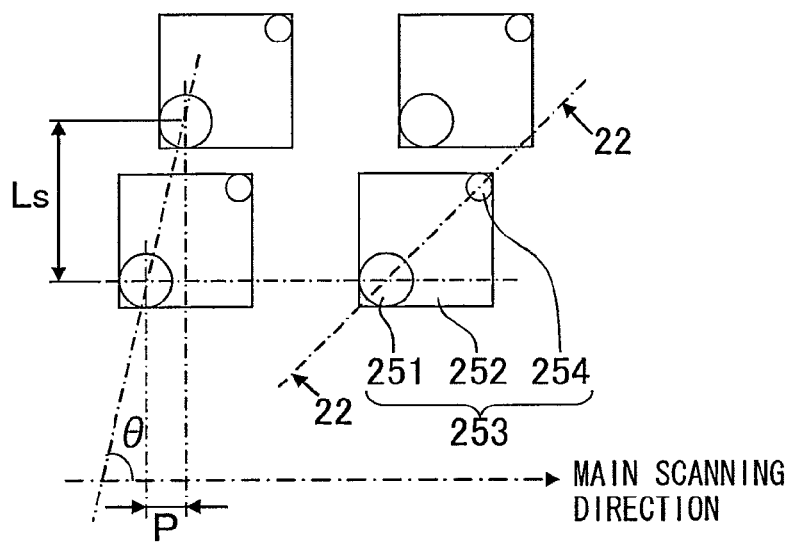
Figure 21A:
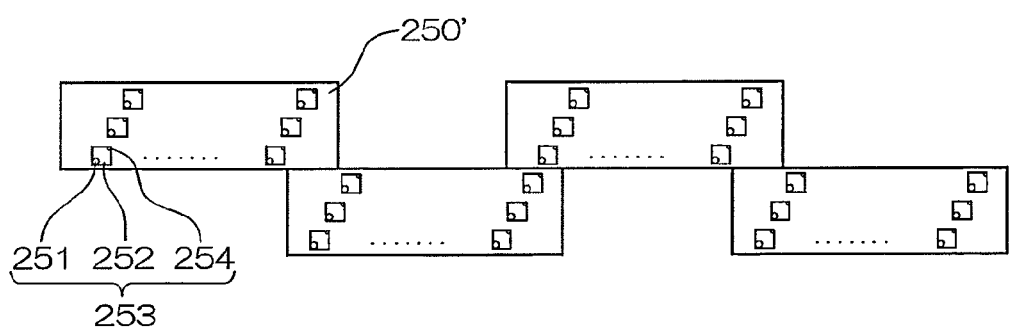
FIGS. 21A and 21B are plan view perspective diagrams showing further examples of the structure of a head.
Figure 21B:
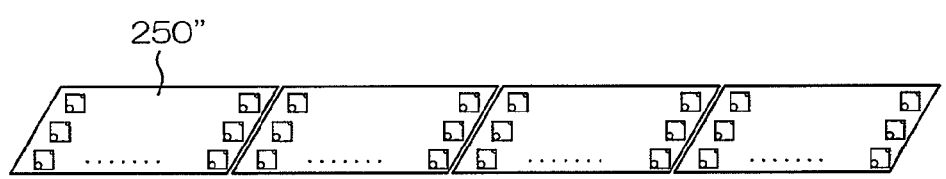

FIG. 20A is a plan perspective diagram illustrating an example of the structure of a head 250, and FIG. 20B is a partial enlarged diagram of same. FIGS. 21A and 21B each show an arrangement example of a plurality of head modules forming the head 250. Moreover, FIG. 22 is a cross-sectional diagram (a cross-sectional diagram along line 22-22 in FIGS. 20A and 20B) illustrating a structure of a liquid droplet ejection element for one channel being a recording element unit (ejection element unit).

Figure 22:
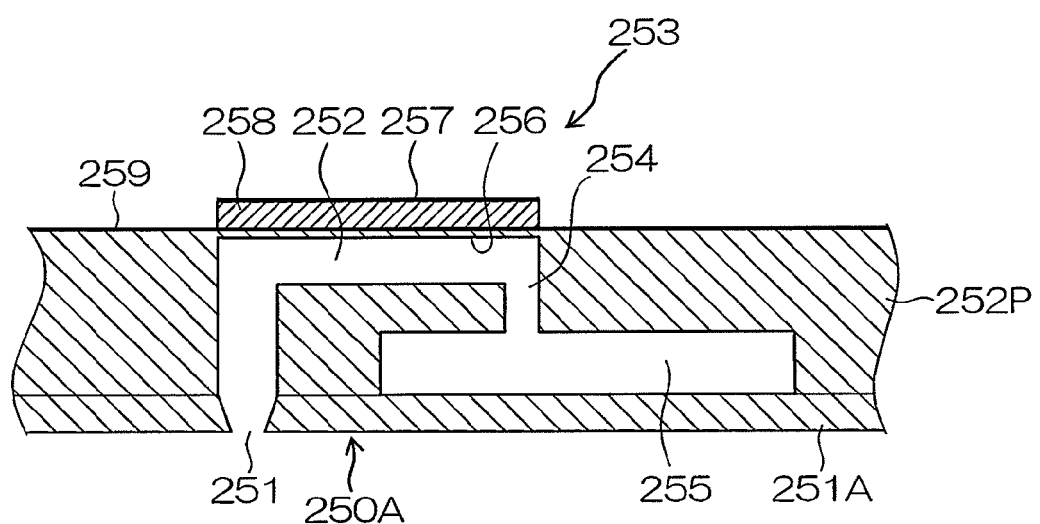
FIG. 22 is a cross-sectional diagram along line 22-22 in FIGS. 20A and 20B.

As illustrated in FIG. 22, the head 250 according to the present embodiment has a structure in which a plurality of ink chamber units (liquid droplet ejection elements) 253, each having a nozzle 251 forming an ink droplet ejection aperture, a pressure chamber 252 corresponding to the nozzle 251, and the like, are disposed two-dimensionally in the form of a staggered matrix, and hence the effective nozzle interval (the projected nozzle pitch) as projected (orthographically-projected) in the lengthwise direction of the head (the direction perpendicular to the paper conveyance direction) is reduced and high nozzle density is achieved.

In order to form a row of nozzles that is equal to or longer than a length accommodating an entire width Wm of a rendering area of the recording medium 124 in a direction (a direction of an arrow M; corresponding to the "second direction") which is approximately perpendicular to a feed direction (a direction of an arrow S; corresponding to the "first direction") of the recording medium 124, for example, as shown in FIG. 21A, short head modules 250' having a plurality of nozzles 251 in a two-dimensional arrangement are disposed in a staggered pattern to form a long linear head. Alternatively, as shown in FIG. 21B, a mode can be adopted in which head modules 250" are aligned in single rows and then joined together. The head modules 250' or 250" shown in FIGS. 21A and 21B correspond to the recording head 60 illustrated in FIG. 18.

Moreover, with a single-pass printing full-line print head, in addition to a case where an entire surface of the recording medium 124 is set as a rendering range, when a portion on the surface of the recording medium 124 is set as a rendering range (for example, when a non-rendering range (margin) is provided in peripheries of the paper), a row of nozzles necessary for rendering within a predetermined rendering area need only be formed.

A pressure chamber 252 provided to each nozzle 251 has substantially a square planar shape (see FIGS. 21A and 21B), and has an outlet port for the nozzle 251 at one of diagonally opposite corners and an inlet port (supply port) 254 for receiving the supply of the ink at the other of the corners. The planar shape of the pressure chamber 252 is not limited to this embodiment and can be various shapes including quadrangle (rhombus, rectangle, etc.), pentagon, hexagon, other polygons, circle, and ellipse.

As illustrated in FIG. 22, the head 250 (head modules 250', 250") is configured by stacking and joining together a nozzle plate 251A in which the nozzles 251 are formed, a flow channel plate 252P in which the pressure chambers 252 and the flow channels including the common flow channel 255 are formed, and the like. The nozzle plate 251A constitutes a nozzle surface (ink ejection surface) 250A of the head 250 and has formed therein a plurality of two-dimensionally arranged nozzles 251 communicating respectively to the pressure chambers 252.

The flow channel plate 252P constitutes lateral side wall parts of the pressure chamber 252 and serves as a flow channel formation member which forms the supply port 254 as a limiting part (the narrowest part) of the individual supply channel leading the ink from the common flow channel 255 to the pressure chamber 252. FIG. 22 is simplified for the convenience of explanation, and the flow channel plate 252P may be structured by stacking one or more substrates.

The nozzle plate 251A and the flow channel plate 252P can be made of silicon and formed in the required shapes by means of the semiconductor manufacturing process.

The common flow channel 255 is connected to an ink tank (not shown) which is a base tank for supplying ink, and the ink supplied from the ink tank is delivered through the common flow channel 255 to the pressure chambers 252.

A piezo-actuator (piezoelectric element) 258 having an individual electrode 257 is joined onto a diaphragm 256 constituting a part of faces (the ceiling face in FIG. 22) of the pressure chamber 252. The diaphragm 256 in the present embodiment is made of silicon (Si) having a nickel (Ni) conductive layer serving as a common electrode 259 forming lower electrodes of a plurality of piezo-actuators 258, and also serves as the common electrode of the piezo-actuators 258, which are disposed corresponding to the respective pressure chambers 252. The diaphragm 256 can be formed by a non-conductive material such as resin; and in this case, a common electrode layer made of a conductive material such as metal is formed on the surface of the diaphragm member. It is also possible that the diaphragm is made of metal (an electrically-conductive material) such as stainless steel (SUS), which also serves as the common electrode.

When a drive voltage is applied to the individual electrode 257, the piezo-actuator 258 is deformed, the volume of the pressure chamber 252 is thereby changed, and the pressure in the pressure chamber 252 is thereby changed, so that the ink inside the pressure chamber 252 is ejected through the nozzle 251. When the displacement of the piezo-actuator 258 is returned to its original state after the ink is ejected, new ink is refilled in the pressure chamber 252 from the common flow channel 255 through the supply port 254.

As illustrated in FIG. 20B, the plurality of ink chamber units 253 having the above-described structure are arranged in a prescribed matrix arrangement pattern in a line direction along the main scanning direction and a direction oblique at a given angle of $\theta$ which is not orthogonal to the main scanning direction, and thereby the high density nozzle head is formed in the present embodiment. In this matrix arrangement, the nozzles 251 can be regarded to be equivalent to those substantially arranged linearly at a fixed pitch $P=L_s/\tan\theta$ along the main scanning direction, where $L_s$ is a distance between the nozzles adjacent in the sub-scanning direction.

In implementing the present invention, the mode of arrangement of the nozzles 251 in the head 250 is not limited to the embodiments in the drawings, and various nozzle arrangement structures can be employed.

The means for generating pressure (ejection energy) applied to eject droplets from the nozzles in the inkjet head is not limited to the piezo-actuator (piezoelectric element), and can employ various pressure generation devices (ejection energy generation devices) such as electrostatic actuators, heaters (heating elements) in a thermal system (which uses the pressure resulting from film boiling by the heat of the heaters to eject ink), and various actuators in other systems. According to the ejection system employed in the head, the corresponding energy generation elements are arranged in the flow channel structure body.

Description of Control System

Figure 23:
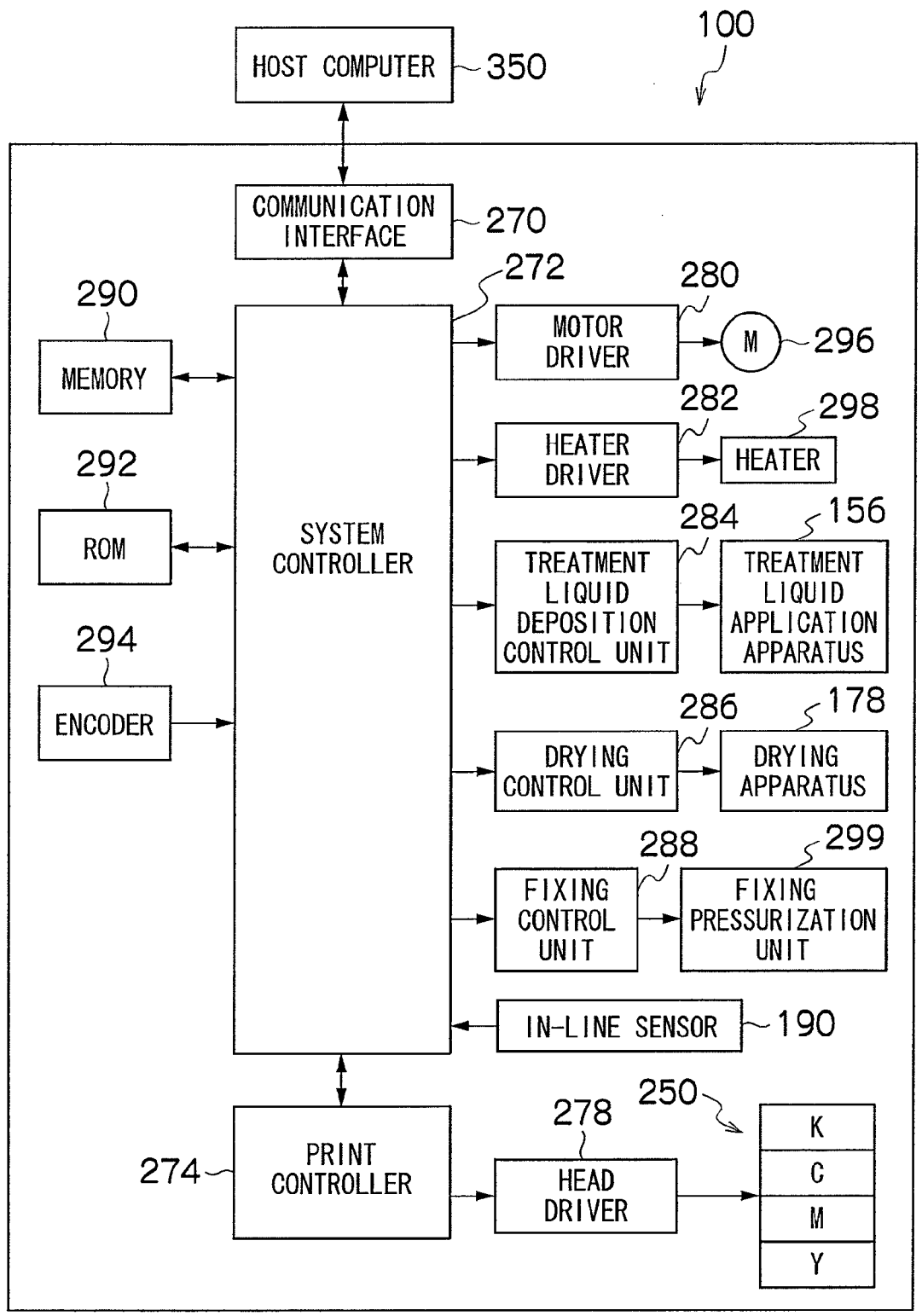
FIG. 23 is a principal block diagram showing a system composition of an inkjet recording apparatus.

FIG. 23 is a principal block diagram showing a system composition of the inkjet recording apparatus 100. The inkjet recording apparatus 100 includes: a communication interface 270, a system controller 272, a print controller 274, an image buffer memory 276, a head driver 278, a motor driver 280, a heater driver 282, a treatment liquid deposition control unit 284, a drying control unit 286, a fixing control unit 288, a memory 290, a ROM 292, an encoder 294, and the like.

The communication interface 270 is an interface unit for receiving image data sent from a host computer 350. A serial interface such as USB (Universal Serial Bus), IEEE1394, Ethernet (registered trademark), and wireless network, or a parallel interface such as a Centronics interface may be used as the communication interface 270. A buffer memory (not shown) may be mounted in this portion in order to increase the communication speed. The image data sent from the host computer 350 is received by the inkjet recording apparatus 100 through the communication interface 270, and is temporarily stored in the memory 290.

The memory 290 is a storage device for (temporarily) storing images inputted through the communication interface 270, and data is written and read to and from the memory 290 through the system controller 272. The memory 290 is not limited to a memory composed of semiconductor elements, and a hard disk drive or another magnetic medium may be used.

The system controller 272 is constituted of a central processing unit (CPU) and peripheral circuits thereof, and the like, and it functions as a control device for controlling the whole of the inkjet recording apparatus 100 in accordance with a prescribed program, as well as a calculation device for performing various calculations. More specifically, the system controller 272 controls the various sections, such as the communication interface 270, print controller 274, motor driver 280, heater driver 282 and treatment liquid deposition control unit 284, as well as controlling communications with the host computer 350 and writing and reading to and from the memory 290, and it also generates control signals for controlling the motor 296 and heater 298 of the conveyance system.

Programs to be executed by the CPU of the system controller 272 and various data required for control purposes are stored in the ROM 292. The ROM 292 may be a non-rewriteable storage device, or may be a rewriteable storage device such as an EEPROM. The memory 290 is used as a temporary storage area for image data and also serves as a development area for programs and a calculation work area for the CPU.

The motor driver 280 is a driver which drives the motor 296 in accordance with instructions from the system controller 272. In FIG. 23, various motors arranged in the respective units of the apparatus are represented by the reference numeral 296. For example, the motor 296 shown in FIG. 23 includes motors which drive the rotation of the paper supply drum 152, the treatment liquid drum 154, the image formation drum 170, the drying drum 176, the fixing drum 184, the transfer drum 194, and the like, shown in FIG. 19, and a drive motor of the pump for negative pressure suctioning from the suction holes of the image formation drum 170, a motor of a withdrawal mechanism which moves the head units of the inkjet heads 172M, 172K, 172C and 172Y to a maintenance area apart from the image formation drum 170, and the like.

The heater driver 282 is a driver which drives the heater 298 in accordance with instructions from the system controller 272. In FIG. 23, various heaters arranged in the respective units of the apparatus are represented by the reference numeral 298. For example, the heater 298 shown in FIG. 23 include a pre-heater (not illustrated) for previously heating the recording medium 124 to a suitable temperature in the paper supply unit 112, and the like.

The print controller 274 is a control unit which has signal processing functions for carrying out processing, correction, and other treatments in order to generate a print control signal on the basis of the image data in the memory 290, in accordance with the control of the system controller 272, and which supplies the print data (dot data) thus generated to the head driver 278.

As shown in FIG. 18, the dot data is generated by subjecting the multiple-tone image data to color conversion processing and half-tone processing. The color conversion processing is processing for converting image data represented by an sRGB system, for instance (for example, 8-bit image data for each of RGB colors) into image data of the respective colors of ink used by the inkjet image printing apparatus 100 (color data, in the present embodiment).

Required signal processing is carried out in the print controller 274, and the ejection volume and the ejection timing of the ink droplets in the head 250 are controlled via the head driver 278 on the basis of the obtained dot data. By this means, a desired dot size and dot arrangement are achieved. The data referred to here corresponds to "nozzle control data".

An image buffer memory (not illustrated) is provided in the print controller 274, and data such as image data and parameters, is stored temporarily in the image buffer memory during processing of the image data in the print controller 274. Furthermore, also possible is a mode in which the print controller 274 and the system controller 272 are integrated to form a single processor.

The encoder 294 detects the speed of rotation of the image formation drum 170, and employs a photo-electric type of rotary encoder, for instance. The system controller 272 calculates the speed of rotation of the image formation drum 170 on the basis of a signal from the encoder 294, generates an ejection timing signal for the nozzles 251 of the inkjet heads 172M, 172K, 172C, 172Y of the respective colors on the basis of the calculated speed of rotation, and supplies this signal to the print control unit 274.

To give a general description of the processing from image input until print output, the image data that is to be printed is input via the communication interface 270 from an external source and is stored in the memory 290. At this stage, for example, RGB image data is stored in the memory 290. In the inkjet recording apparatus 100, an image having tones which appear continuous to the human eye is formed by altering the droplet ejection density and size of fine dots of ink (coloring material), and therefore it is necessary to convert the tones of the input digital image (light/dark density of the image) into a dot pattern which reproduces the tones as faithfully as possible. Consequently, data of the original image (RGB) accumulated in the memory 290 is sent to the print controller 274 via the system controller 272, and is converted into dot data for each ink color by a half-toning process in the print controller 274. In other words, the print controller 274 carries out processing for converting the input RGB image data into dot data for the four colors of K, C, M and Y. In this way, dot data generated by the print controller 274 is stored in the image buffer memory (not illustrated).

The head driver 278 outputs a drive signal for driving the actuators corresponding to the respective nozzles of the head 250 on the basis of the print data supplied from the print controller 274 (in other words, dot data stored in the image buffer memory 276). The head driver 278 may also incorporate a feedback control system for maintaining uniform drive conditions in the heads.

By applying a drive signal output from the head driver 278 to the head 250 in this way, ink is ejected from the corresponding nozzles. An image is formed on a recording medium 124 by controlling ink ejection from the head 250 while conveying the recording medium 124 at a prescribed speed.

The treatment liquid deposition control unit 284 controls the operation of the treatment liquid application apparatus 156 (see FIG. 19) in accordance with instructions from the system controller 272. The drying control unit 286 controls the operation of the solvent drying apparatus 178 (see FIG. 19) in accordance with instructions from the system controller 272.

The fixing control unit 288 controls the operation of a fixing pressurization unit 299 which is constituted by the halogen heater 186 and the fixing roller 188 (see FIG. 19) of the fixing unit 120.

As described with reference to FIG. 19, the in-line sensor 190 is a block including an image sensor, reads in the image printed on the recording medium 124, performs required signal processing operations, and the like, and determines the print situation (presence/absence of ejection, variation in droplet ejection, optical density, and the like), these determination results being supplied to the system controller 272 and the print controller 274.

The print controller 274 implements various corrections (ejection failure correction, density correction or the like) with respect to the head 250, on the basis of the information obtained from the in-line sensor 190, and it implements control for carrying out cleaning operations (nozzle restoring operations), such as preliminary ejection, suctioning, or wiping, as and when necessary.

The portion of the system controller 272, the print controller 274 (with built-in image buffer memory) and the head driver 278 illustrated in FIG. 23 corresponds to the head control apparatus 70 illustrated in FIG. 18. A mode may be adopted in which all or a portion of the processing functions carried out by the system controller 272 shown in FIG. 23 are installed in the host computer 350.

Modification Example

In the embodiments described above, an inkjet recording apparatus based on a method which forms an image by ejecting ink droplets directly onto the recording medium 124 (direct recording method) is described, but the application of the present invention is not limited to this, and the present invention can also be applied to an image forming apparatus of an intermediate transfer type which provisionally forms an image (primary image) on an intermediate transfer body, and then performs final image formation by transferring the image onto recording paper in a transfer unit.

Furthermore, in the embodiments described above, an inkjet recording apparatus using a page-wide full-line type head having a nozzle row of a length corresponding to the full width of the recording medium (a single-pass image forming apparatus which completes an image by a single sub-scanning action) is described, but the application of the present invention is not limited to this and the present invention can also be applied to an inkjet recording apparatus which performs image recording by means of a plurality of head scanning (moving) actions of a short recording head, such as a serial head (shuttle scanning head), or the like.

Device for Causing Relative Movement of Head and Paper

In the embodiment described above, an example is given in which a recording medium is conveyed with respect to a stationary head, but in implementing the present invention, it is also possible to move a head with respect to a stationary recording medium (image formation receiving medium). A full line type recording head based on a single pass method is normally arranged in a direction perpendicular to the feed direction of the recording medium (conveyance direction), but a mode is also possible in which a head is arranged in an oblique direction forming a certain prescribed angle with respect to the direction perpendicular to the conveyance direction.

Recording Medium

"Recording medium" is a collective term for media on which dots are recorded by a recording element and include variously named media such as a print medium, a recorded medium, an image-formed medium, an image-receiving medium, and an ejection-receiving medium. When implementing the present invention, materials, shapes, and the like of the recorded medium are not particularly restricted. The present invention can be applied to various types of media regardless of material or shape including continuous-form paper, a cut sheet, a printer label, a resin sheets such as an OHP sheet, film, cloth, a print board on which a wiring pattern or the like can be formed, and a rubber sheet.

Application of the Present Invention

In the embodiments described above, application to the inkjet recording apparatus for graphic printing has been described, but the scope of application of the present invention is not limited to this. For example, the present invention can be applied widely to inkjet systems which forms various shapes or patterns using liquid function material, such as a wire printing apparatus which forms an image of a wire pattern for an electronic circuit, manufacturing apparatuses for various devices, a resist printing apparatus which uses resin liquid as a functional liquid for ejection, a color filter manufacturing apparatus, a fine structure forming apparatus for forming a fine structure using a material for material deposition, and the like.

APPENDIX

As has become evident from the detailed description of the embodiments of the invention given above, the present specification includes disclosure of various technical ideas including the aspects of the invention described below.

One aspect of the invention is directed to an image processing apparatus for generating binary or multiple-value image data for forming an image on a recording medium by ejecting droplets from nozzles of nozzle rows of a recording head while relative movement between the recording medium and the recording head is caused, the nozzles serving as ejection ports for ejecting the droplets, the image processing apparatus comprising a multiple value conversion device which carries out quantization processing of original image data having multiple tones (M values) so as to convert the original image data to image data of N values having fewer tones than the original image data (where M and N are integers satisfying M>N≧2), wherein: the recording head has a two-dimensional nozzle arrangement in which the nozzle rows are arranged in a first direction which is a direction of the relative movement between the recording head and the recording medium, and the multiple value conversion device generates the image data of N values representing a dot pattern having blue noise characteristics in the first direction and green noise characteristics in a second direction which is a direction perpendicular to the first direction on the recording medium so as to achieve tonal representation based on the dot pattern having these frequency characteristics.

According to this aspect of the invention, dots are arranged at high frequency (with little continuous arrangement of dots) in the first direction and dots are arranged in continuous fashion to a certain extent (at low frequency) in the second direction. According to this mode, combination of dots in the first direction is suppressed. Furthermore, since the pattern also has high frequency, granularity is also improved.

Since the landing time difference between adjacent dots is relatively long in the second direction, then the combination phenomenon becomes less liable to occur and granularity does not become worse in this direction. Furthermore, from the characteristics of the pattern in which dots are arranged continuously in the second direction, adjacent dots overlap partially with each other and band-shaped non-uniformities are not liable to occur.

Desirably, a dot pattern having the frequency characteristics described above is generated for a particular tone range of the intermediate tones.

Desirably, when frequency components of the dot pattern are integrated in the second direction, there is a maximum in a vicinity of a Nyquist frequency in terms of the first direction, and when the frequency components of the dot pattern are integrated in the first direction in a frequency range higher than ½ of the Nyquist frequency, a component of wavenumber 0 is suppressed in terms of the second direction and there is a maximum in an intermediate frequency range lower than the Nyquist frequency.

When the pattern is converted by two-dimensional Fourier transform and the components are examined in a frequency space coordinates system, desirably, characteristics such as those described above are obtained. The Nyquist frequency is determined according to the recording resolution (print resolution).

Desirably, the dot pattern includes second-direction line segment patterns which each have a plurality dots ranging continuously in the second direction and which are arranged at a period twice a recording resolution in terms of the first direction.

According to this mode, second-direction line segment patterns are arranged approximately every other pixel in the first direction.

Desirably, a dot is arranged between the second-direction line segment patterns arranged adjacently in the first direction in such a manner that the dot connects together the second-direction line segment patterns arranged adjacently in the first direction.

A desirable mode is one where tonal representation of a tonal range on a shadow side is carried out by arranging dots in a distributed fashion between second-direction line segment patterns which are arranged at high frequency in the first direction.

Desirably, the recording head is capable of recording dots of a plurality of types having different sizes by altering volumes of the droplets ejected from the nozzles, the multiple value conversion device generates the image data of N values according to number of size types of the dots which the recording head is capable of recording, the second-direction line segment patterns are formed by relatively small dots of the dots of the plurality of types, and a relatively large dot of the dots of the plurality of types is formed as the dot which connects together the second-direction line segment patterns arranged adjacently in the first direction.

If dot sizes (droplet volumes) of two or more types can be ejected selectively, then desirably, second-direction line segment patterns which are continuous in the second direction are small dots (small droplets) and dots which are arranged in distributed fashion between the second-direction line segment patterns are larger dots.

Desirably, diameters of the dots which record the second-direction line segment patterns are not more than twice a period of the recording resolution in the first direction.

According to this mode, dots in the first direction do not interfere with each other, and therefore worsening of the granularity is suppressed.

Desirably, the recording head is capable of recording dots of a plurality of types having different sizes by altering volumes of the droplets ejected from the nozzles, the multiple value conversion device generates the image data of N values corresponding to number of size types of the dots which the recording head is capable of recording, and in the second-direction line segment patterns, relatively small dots and relatively large dots from among the dots of the plurality of types are alternately arranged in the second direction.

According to this mode, since small dots and large dots are distributed with a partial overlap therebetween in the second direction, then banding is not liable to occur.

Desirably, an average dot diameter of the relatively small dots and the relatively large dots forming the second-direction line segment patterns is not less than twice a period of the recording resolution in terms of the first direction.

According to this mode, the white background between the second-direction line segment patterns is covered over neatly, and granularity is improved.

Desirably, the image processing apparatus further comprises a region dividing device which divides an image region into a plurality of regions according to a mask pattern having blue noise characteristics in the first direction and green noise characteristics in the second direction, wherein the tonal representation is achieved by changing a density of dots arranged within at least a portion of the regions divided by the region dividing device.

For example, the region is divided into two regions using a binary mask pattern having the frequency characteristics described above (high frequency characteristics in the first direction and lower frequency characteristics in the second direction).

Desirably, of the plurality of regions divided, if a region which overlaps with the mask pattern is defined as a first region and a region outside the first region is defined as a second region, then for a relatively low tone range, the multiple value conversion device changes the density of the dots in the first region under a restriction that dots are to be arranged only in the first region, and for a relatively high tone range, the multiple value conversion device arranges the dots in the whole of the first region and changes the density of the dots in the second region to achieve the tonal representation, the dots arranged in the second region being located in a distributed fashion in the second direction.

Since dots are arranged at high frequency in the first direction, then it is possible to suppress deterioration of the granularity in intermediate tones and shadow regions, due to landing interference, as well as being able to suppress banding non-uniformities due to landing position displacement. Furthermore, since band-shaped patterns which are continuous in the second direction and patterns of dots which are distributed so as to connect between these band-shaped patterns coexist, then granularity is good.

Desirably, the dots arranged in the second region are dots having a size different from that of the dots arranged in the first region.

Desirably, the size of the dots arranged in the second region is large compared to the dots arranged in the first region.

Desirably, a diameter of the dots covering the first region is not more than twice a recording resolution in the first direction.

According to this mode, dots which are mutually adjacent in the first direction are not liable to interfere with each other.

Desirably, of the plurality of regions divided, if a region which overlaps with the mask pattern is defined as a first region and a region outside the first region is defined as a second region, then the multiple value conversion device changes the density of dots in the first region under a restriction that dots are to be arranged only in the first region in a relatively low tone range, and the multiple value conversion device changes a use ratio of dots of different sizes in the first region so as to achieve the tonal representation, and arranges the dots of different sizes in such a manner that the size changes at a high frequency when the dots are arranged continuously in the second direction, in a relatively high tone range.

According to this mode, it is possible to generate a dot pattern which both prevents deterioration of granularity due to landing interference and suppresses banding non-uniformity.

Desirably, an average of the sizes of the plurality of dots of different sizes which are arranged continuously in the second direction is not less than twice a period of a recording resolution in the first direction.

According to this mode, dots are distributed with overlap therebetween, and banding is not liable to occur.

Desirably, the region dividing device divides the image region by using a dither matrix having blue noise characteristics in the first direction and green noise characteristics in the second direction.

It is possible to divide regions by using a dither matrix having the frequency characteristics described above and comparing with a threshold value, in the intermediate tone range.

Desirably, a quantization error occurring due to quantization of pixels of the original image data is diffused into a peripheral unquantized pixel, and quantization of each pixel is earned out according to the diffused quantization error, a tone value of each pixel and processing restrictions corresponding to the regions divided by the region dividing device.

It is possible to achieve a desired pattern by combining use of a mask pattern (for example, a dither matrix) for dividing the image region and an error diffusion method.

Desirably, a larger amount of the quantization error is diffused in the second direction, compared to when the quantization error is distributed uniformly to the peripheral pixel.

According to this mode, dots are distributed in the second direction and the overall distribution characteristics are improved and granularity is improved.

Another aspect of the invention is directed to an image processing method of generating binary or multiple-value image data for forming an image on a recording medium by ejecting droplets from nozzles of nozzle rows of a recording head while relative movement between the recording medium and the recording head is caused, the nozzles serving as ejection ports for ejecting the droplets, the image processing method comprising a multiple value conversion step of carrying out quantization processing of original image data having multiple tones (M values) so as to convert the original image data to image data of N values having fewer tones than the original image data (where M and N are integers satisfying M>N≧2), wherein: the recording head has a two-dimensional nozzle arrangement in which the nozzle rows are arranged in a first direction which is a direction of the relative movement between the recording head and the recording medium, and in the multiple value conversion step, the image data of N values representing a dot pattern having blue noise characteristics in the first direction and green noise characteristics in a second direction which is a direction perpendicular to the first direction on the recording medium is generated so as to achieve tonal representation based on the dot pattern having these frequency characteristics.

It is also possible to adopt modes which combines one or more of the above-described features with this aspect.

Another aspect of the invention is directed to an image forming apparatus comprising: a recording head having a nozzle row in which a plurality of nozzles serving as ejection ports for ejecting droplets are arranged; a relative movement device which causes relative movement of the recording head and a recording medium; an image processing apparatus as defined above; and a recording control device which controls a droplet ejection operation from the plurality of nozzles of the recording head according to the image data of N values generated by the image processing apparatus.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image processing apparatus for generating binary or multiple-value image data for forming an image on a recording medium by ejecting droplets from nozzles of nozzle rows of a recording head while relative movement between the recording medium and the recording head is caused, the nozzles serving as ejection ports for ejecting the droplets, the image processing apparatus comprising a multiple value conversion device which carries out quantization processing of original image data having multiple tones (M values) so as to convert the original image data to image data of N values having fewer tones than the original image data (where M and N are integers satisfying M>N≧2), wherein:

the recording head has a two-dimensional nozzle arrangement in which the nozzle rows are arranged in a first direction which is a direction of the relative movement between the recording head and the recording medium, and the multiple value conversion device generates the image data of N values representing a dot pattern having blue noise characteristics in the first direction and green noise characteristics in a second direction which is a direction perpendicular to the first direction on the recording medium so as to achieve tonal representation based on the dot pattern having these frequency characteristics.

2. The image processing apparatus as defined in claim 1, wherein, when frequency components of the dot pattern are integrated in the second direction, there is a maximum in a vicinity of a Nyquist frequency in terms of the first direction, and when the frequency components of the dot pattern are integrated in the first direction in a frequency range higher than ½ of the Nyquist frequency, a component of wavenumber 0 is suppressed in terms of the second direction and there is a maximum in an intermediate frequency range lower than the Nyquist frequency.

3. The image processing apparatus as defined in claim 1, wherein the dot pattern includes second-direction line segment patterns which each have a plurality dots ranging continuously in the second direction and which are arranged at a period twice a recording resolution in terms of the first direction.

4. The image processing apparatus as defined in claim 3, wherein a dot is arranged between the second-direction line segment patterns arranged adjacently in the first direction in such a manner that the dot connects together the second-direction line segment patterns arranged adjacently in the first direction.

5. The image processing apparatus as defined in claim 4, wherein:
the recording head is capable of recording dots of a plurality of types having different sizes by altering volumes of the droplets ejected from the nozzles,
the multiple value conversion device generates the image data of N values according to number of size types of the dots which the recording head is capable of recording,
the second-direction line segment patterns are formed by relatively small dots of the dots of the plurality of types, and
a relatively large dot of the dots of the plurality of types is formed as the dot which connects together the second-direction line segment patterns arranged adjacently in the first direction.

6. The image processing apparatus as defined in claim 3, wherein diameters of the dots which record the second-direction line segment patterns are not more than twice a period of the recording resolution in the first direction.

7. The image processing apparatus as defined in claim 3, wherein:
the recording head is capable of recording dots of a plurality of types having different sizes by altering volumes of the droplets ejected from the nozzles,
the multiple value conversion device generates the image data of N values corresponding to number of size types of the dots which the recording head is capable of recording, and
in the second-direction line segment patterns, relatively small dots and relatively large dots from among the dots of the plurality of types are alternately arranged in the second direction.

8. The image processing apparatus as defined in claim 7, wherein an average dot diameter of the relatively small dots and the relatively large dots forming the second-direction line segment patterns is not less than twice a period of the recording resolution in terms of the first direction.

9. The image processing apparatus as defined in claim 1, further comprising a region dividing device which divides an image region into a plurality of regions according to a mask pattern having blue noise characteristics in the first direction and green noise characteristics in the second direction,
  wherein the tonal representation is achieved by changing a density of dots arranged within at least a portion of the regions divided by the region dividing device.

10. The image processing apparatus as defined in claim 9, wherein:
  of the plurality of regions divided, if a region which overlaps with the mask pattern is defined as a first region and a region outside the first region is defined as a second region, then
  for a relatively low tone range, the multiple value conversion device changes the density of the dots in the first region under a restriction that dots are to be arranged only in the first region, and
  for a relatively high tone range, the multiple value conversion device arranges the dots in the whole of the first region and changes the density of the dots in the second region to achieve the tonal representation, the dots arranged in the second region being located in a distributed fashion in the second direction.

11. The image processing apparatus as defined in claim 10, wherein the dots arranged in the second region are dots having a size different from that of the dots arranged in the first region.

12. The image processing apparatus as defined in claim 10, wherein a diameter of the dots covering the first region is not more than twice a recording resolution in the first direction.

13. The image processing apparatus as defined in claim 9, wherein:
  of the plurality of regions divided, if a region which overlaps with the mask pattern is defined as a first region and a region outside the first region is defined as a second region, then
  the multiple value conversion device changes the density of dots in the first region under a restriction that dots are to be arranged only in the first region in a relatively low tone range, and
  the multiple value conversion device changes a use ratio of dots of different sizes in the first region so as to achieve the tonal representation, and arranges the dots of different sizes in such a manner that the size changes at a high frequency when the dots are arranged continuously in the second direction, in a relatively high tone range.

14. The image processing apparatus as defined in claim 13, wherein an average of the sizes of the plurality of dots of different sizes which are arranged continuously in the second direction is not less than twice a period of a recording resolution in the first direction.

15. The image processing apparatus as defined in claim 9, wherein the region dividing device divides the image region by using a dither matrix having blue noise characteristics in the first direction and green noise characteristics in the second direction.

16. The image processing apparatus as defined in claim 9, wherein a quantization error occurring due to quantization of pixels of the original image data is diffused into a peripheral unquantized pixel, and quantization of each pixel is carried out according to the diffused quantization error, a tone value of each pixel and processing restrictions corresponding to the regions divided by the region dividing device.

17. The image processing apparatus as defined in claim 16, wherein a larger amount of the quantization error is diffused in the second direction, compared to when the quantization error is distributed uniformly to the peripheral pixel.

18. An image processing method of generating binary or multiple-value image data for forming an image on a recording medium by ejecting droplets from nozzles of nozzle rows of a recording head while relative movement between the recording medium and the recording head is caused, the nozzles serving as ejection ports for ejecting the droplets,
  the image processing method comprising a multiple value conversion step of carrying out quantization processing of original image data having multiple tones (M values) so as to convert the original image data to image data of N values having fewer tones than the original image data (where M and N are integers satisfying $M > N \geq 2$), wherein:
  the recording head has a two-dimensional nozzle arrangement in which the nozzle rows are arranged in a first direction which is a direction of the relative movement between the recording head and the recording medium, and
  in the multiple value conversion step, the image data of N values representing a dot pattern having blue noise characteristics in the first direction and green noise characteristics in a second direction which is a direction perpendicular to the first direction on the recording medium is generated so as to achieve tonal representation based on the dot pattern having these frequency characteristics.

19. An image forming apparatus comprising:
  a recording head having a nozzle row in which a plurality of nozzles serving as ejection ports for ejecting droplets are arranged;
  a relative movement device which causes relative movement of the recording head and a recording medium;
  an image processing apparatus defined in claim 1; and
  a recording control device which controls a droplet ejection operation from the plurality of nozzles of the recording head according to the image data of N values generated by the image processing apparatus.

* * * * *